US011238857B2

(12) United States Patent
Skobeltsyn et al.

(10) Patent No.: US 11,238,857 B2
(45) Date of Patent: Feb. 1, 2022

(54) SUPPLEMENTING VOICE INPUTS TO AN AUTOMATED ASSISTANT ACCORDING TO SELECTED SUGGESTIONS

(71) Applicant: Google LLC, Mountain View, CA (US)

(72) Inventors: Gleb Skobeltsyn, Kilchberg (CH); Olga Kapralova, Bern (CH); Konstantin Shagin, Adliswil (CH); Vladimir Vuskovic, Zollikerberg (CH); Yufei Zhao, San Francisco, CA (US); Bradley Nelson, Mountain View, CA (US); Alessio Macrí, London (GB); Abraham Lee, Belmont, CA (US)

(73) Assignee: Google LLC, Mountain View, CA (US)

( * ) Notice: Subject to any disclaimer, the term of this patent is extended or adjusted under 35 U.S.C. 154(b) by 391 days.

(21) Appl. No.: 16/343,683

(22) PCT Filed: Feb. 7, 2019

(86) PCT No.: PCT/US2019/017043
§ 371 (c)(1),
(2) Date: Apr. 19, 2019

(87) PCT Pub. No.: WO2020/139408
PCT Pub. Date: Jul. 2, 2020

(65) Prior Publication Data
US 2021/0280180 A1    Sep. 9, 2021

Related U.S. Application Data

(60) Provisional application No. 62/785,842, filed on Dec. 28, 2018.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/18* (2013.01); *G10L 15/28* (2013.01); *G10L 2015/223* (2013.01)

(58) Field of Classification Search
None
See application file for complete search history.

(56) References Cited

U.S. PATENT DOCUMENTS 8,645,825 B1     2/2014  Cornea et al.
8,706,503 B2 *   4/2014  Cheyer ............. H04M 1/72484
                                                    704/275

(Continued)

FOREIGN PATENT DOCUMENTS

WO    2016191352    12/2016

OTHER PUBLICATIONS

European Patent Office; Invitation to Pay Additional Fees for Ser. No PCT/US2019/017043; 16 pages; dated Sep. 30, 2019.

(Continued)

*Primary Examiner* — Jonathan C Kim
(74) *Attorney, Agent, or Firm* — Middleton Reutlinger

(57) ABSTRACT

Implementations described herein relate to providing suggestions, via a display modality, for completing a spoken utterance for an automated assistant, in order to reduce a frequency and/or a length of time that the user will participate in a current and/or subsequent dialog session with the automated assistant. A user request can be compiled from content of an ongoing spoken utterance and content of any selected suggestion elements. When a currently compiled portion of the user request (from content of a selected suggestion(s) and an incomplete spoken utterance) is capable of being performed via the automated assistant, any actions corresponding to the currently compiled portion of the user request can be performed via the automated assis- (Continued)

tant. Furthermore, any further content resulting from performance of the actions, along with any discernible context, can be used for providing further suggestions.

20 Claims, 8 Drawing Sheets

(51) Int. Cl.
*G10L 15/18* (2013.01)
*G10L 15/28* (2013.01)

(56) References Cited

U.S. PATENT DOCUMENTS

| | | | |
|---|---|---|---|
| 8,849,675 B1* | 9/2014 | Foerster | G10L 15/22 |
| | | | 704/275 |
| 9,218,819 B1* | 12/2015 | Stekkelpak | G10L 15/22 |
| 10,818,289 B2* | 10/2020 | Jaygarl | G06F 3/04886 |
| 11,069,347 B2* | 7/2021 | Orr | G10L 15/1815 |
| 11,107,474 B2* | 8/2021 | Akino | G10L 15/22 |
| 11,172,082 B2* | 11/2021 | Yoshimi | H04N 1/00403 |
| 2008/0059186 A1* | 3/2008 | Mowatt | G10L 15/193 |
| | | | 704/257 |
| 2009/0019002 A1 | 1/2009 | Boulis | |
| 2010/0131275 A1* | 5/2010 | Paek | G10L 15/19 |
| | | | 704/257 |
| 2012/0084075 A1 | 4/2012 | Yamada et al. | |
| 2014/0244268 A1* | 8/2014 | Abdelsamie | H04M 1/72412 |
| | | | 704/275 |
| 2014/0257807 A1* | 9/2014 | Mauro | G10L 21/06 |
| | | | 704/235 |
| 2015/0254057 A1* | 9/2015 | Klein | H04N 21/42222 |
| | | | 704/275 |
| 2015/0348551 A1* | 12/2015 | Gruber | H04M 3/4936 |
| | | | 704/235 |
| 2016/0217124 A1* | 7/2016 | Sarikaya | G06F 40/274 |
| 2016/0306509 A1* | 10/2016 | Jeon | H04L 51/18 |
| 2016/0350304 A1* | 12/2016 | Aggarwal | G10L 15/26 |
| 2016/0351196 A1* | 12/2016 | Fanty | G10L 15/1815 |
| 2018/0150280 A1* | 5/2018 | Rhee | G06F 3/0488 |
| 2018/0260680 A1* | 9/2018 | Finkelstein | G10L 15/22 |
| 2018/0285070 A1* | 10/2018 | Yoon | G06F 3/0481 |
| 2018/0329993 A1* | 11/2018 | Bedadala | G06F 16/632 |
| 2018/0330723 A1* | 11/2018 | Acero | G10L 15/1822 |
| 2018/0330730 A1* | 11/2018 | Garg | G10L 15/1815 |
| 2019/0004821 A1* | 1/2019 | Uppal | G06F 9/45512 |
| 2019/0066674 A1* | 2/2019 | Jaygarl | G06F 3/167 |
| 2020/0013410 A1* | 1/2020 | Bond | G10L 13/08 |

OTHER PUBLICATIONS

European Patent Office; International Search Report and Written Opinion of Ser. No. PCT/US2019/017043; 22 pages; dated Nov. 25, 2019.

* cited by examiner

SUPPLEMENTING VOICE INPUTS TO AN AUTOMATED ASSISTANT ACCORDING TO SELECTED SUGGESTIONS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output. An automated assistant may therefore provide a voice-based user interface.

In some instances, a user may provide a spoken utterance that, while intended by the user to cause performance of an automated assistant action, does not result in performance of the intended automated assistant action. For example, the spoken utterance may be provided in a syntax that is not understandable by the automated assistant and/or may lack mandatory parameter(s) for the automated assistant action. As a result, the automated assistant may be unable to fully process the spoken utterance and determine it is a request for the automated assistant action. This leads to the automated assistant providing no response to the spoken utterance, or providing an error in response, such as, "Sorry, I can't help with that" and/or an error tone. Despite the automated assistant failing to perform the intended action of the spoken utterance, various computer and/or network resources are nonetheless consumed in processing the spoken utterance and attempting to resolve an appropriate action. For example, audio data corresponding to the spoken utterance can be transmitted, undergo speech to text processing, and/or undergo natural language processing. Such consumption of resources is wasteful, since the intended automated assistant action is not performed, and the user will likely attempt to provide a reformulated spoken utterance when subsequently seeking performance of the intended automated assistant action. Furthermore, such reformulated spoken utterance will also have to be processed. Further, this results in latency in performance of the automated assistant action, as compared to if the user had instead initially provided a suitable spoken utterance to the automated assistant.

SUMMARY

Implementations described herein relate to providing suggestions, via a display modality, for completing a spoken utterance directed at an automated assistant, and to optionally continually providing updated suggestions, based on a variety of factors, while the spoken utterance is ongoing. For instance, the suggestions can be provided in furtherance of developing an executable dialog phrase that will cause the automated assistant to comprehensively perform automated assistant action(s) initially intended by the user, while also streamlining interactions between the user and the automated assistant. Additionally, or alternatively, the suggestions can be provided in furtherance of encouraging the user to employ the automated assistant to perform actions that can reduce a frequency, and/or a length of time, that the user will participate in a current dialog session and/or subsequent dialog sessions with the automated assistant.

In some implementations, during a dialog session between a user and an automated assistant, the user can provide a spoken utterance in furtherance of causing the automated assistant to perform one or more actions. The spoken utterance can be captured by audio data, and speech-to-text processing performed on the audio data to generate one or more text segments that are each a corresponding interpretation of the spoken utterance. The one or more text segments can be processed in order to determine whether the spoken utterance corresponds to a complete request and/or actionable request. As used herein, a "complete request" or an "actionable request" is one that, when fully processed by an automated assistant, causes performance of one or more corresponding automated assistant actions, where the performed automated assistant action(s) are not default error type actions (e.g., not an audible response of "sorry, I can't help with that"). For example, an actionable request can cause one or more smart devices to be controlled, can cause particular audible and/or graphical content to be rendered, etc. When the spoken utterance is determined to correspond to an incomplete request, the one or more text segments can be further processed in order to determine and provide one or more suggestions for completing the request. Each suggestion of the one or more suggestions can include additional text that, when combined with a corresponding one of the one or more text segments, provides a complete request. In other words, if the user continued their dialog session by reciting text of a particular suggestion (or alternate text that generally conforms to text that is based on the particular suggestion), the automated assistant would perform a corresponding automated assistant action. The generation of suggestions therefore assists the user in performing tasks. While the user is inputting a request, the user is provided with information that guides the user in interaction with the assistant. The information that is presented to the user is based upon the user's existing input and therefore uses an objective analysis to provide information to the user. The user is therefore provided with objectively relevant information to assist the user in carrying out the task.

In some implementations, a computing device(s) can generate different interpretations of a spoken utterance, and the variations in those interpretations can result in corresponding variations to the suggestions that are provided in response to the spoken utterance. For example, a spoken utterance such as, "Assistant, could you please change . . . " can correspond to multiple interpretations by a computing device. The aforementioned spoken utterance can be interpreted as a request to change an IoT device setting via the automated assistant, or as a request to change an application setting via the automated assistant. Each interpretation can be processed in order to generate corresponding suggestions that can be presented to the user via a display panel that is in communication with the computing device. For instance, the computing device can cause the display panel to illustrate the initial text of the spoken utterance (e.g., "Assistant, could you please change . . . ") along with a list of suggestions that are based on both interpretations of the spoken utterance. The suggestions can include at least one suggestion that is based on one interpretation, and at least one other suggestion that is based on another interpretation.

For instance, at least one suggestion based on the "change an IoT device setting" interpretation can be "the thermostat to 72," which can be text that, when spoken by the user, supplements the original spoken utterance. As an example, the display panel can present the original spoken utterance and the at least one suggestion together, in response to the user speaking the text of the at least one suggestion. In other words, the display panel can present the following text: "Assistant, could you please change the thermostat to 72". The user can see the presented text and identify the portion (i.e., "the thermostat to 72") was suggested and not included in their original spoken utterance (i.e., "Assistant, could you please change . . . "). Upon identifying the suggested portion, the user can recite the text of the suggested portion and cause the automated assistant to act in furtherance of completing an action, such as changing a setting of the user's thermostat to 72. In some implementations, the display panel can present, as a suggestion, text that includes only the suggested not-yet spoken portion (e.g., "the thermostat to 72" without presenting "Assistant, could you please"). This can make the suggestion easily glanceable and enable the user to quickly view the suggestion and ascertain further spoken input that the user could provide to formulate an actionable request, such as further spoken input of "the thermostat to 72" or "the thermostat to 70" (which differs from the suggestion, but is ascertainable based on the suggestion).

In various implementations, the textual portion of a suggestion can optionally be presented in combination with an icon or other graphical element that indicates an action that would be performed as a result of providing further spoken input in conformance with the textual portion of the suggestion. As one example, a suggestion can include the textual portion "please change the thermostat to 72", along with a graphical indication of a thermostat and an up and down arrow to indicate further spoken input in conformance with the suggestion would result in change in a set point of the thermostat. As another example, a suggestion can include the textual portion "play TV station on living room TV", along with a television outline having a play icon within, to indicate further spoken input in conformance with the suggestion would result in playing of streaming content on a television. As yet another example, a suggestion can include "turn off the living room lights", along with a light bulb icon having an X overlaid upon it, to indicate further spoken input in conformance with the suggestion would result in turning off light(s). Such icons can also make the suggestion more easily glanceable, enabling the user to first quickly view the icon and, if the icon is in conformance with the users desired action, then view the textual portion of the suggestion. This can enable the user to quickly glance at graphical elements of multiple simultaneously presented suggestions (without initially reading the corresponding textual portions), ascertain one that conforms to the user's intent, then read only the corresponding textual portion of that one. This can reduce latency with which the user provides further spoken input when presented with multiple suggestions, and resultantly reduces latency of performance of the resulting action.

In some implementations, a spoken utterance can be interpreted differently as a result of the way a user has articulated and/or pronounced a particular word. For example, a computing device receiving the aforementioned spoken utterance of "Assistant, could you please change . . . " can determine with X % certainty that the spoken utterance includes the word "change", and a Y % certainty (where Y is less than X) that the spoken utterance includes the word "arrange" and thus refers to a request to perform an "Arrange" function. For instance, speech-to-text processing of the spoken utterance can result in the two separate interpretations ("change" and "arrange") with the differing certainties. As a result, an automated assistant that is tasked with responding to the spoken utterance can present suggestions that are based on each interpretation ("change" and "arrange"). For instance, the automated assistant can graphically present a first suggestion such as " . . . the thermostat to 72," which corresponds to the "change" interpretation, and a second suggestion such as " . . . my desktop file folder," which corresponds to the "arrange" interpretation. Furthermore, if the user subsequently recites the content of the first suggestion by reciting "the thermostat to 72" (or similar content such as "thermostat to 80"), the user can cause the "change" function to be performed via the automated assistant (and based on the user's further recitation). However, if the user subsequently recites the content of the second suggestion by reciting "my desktop file folder" (or similar content such as "my documents folder"), the user can cause the "arrange" function to be performed via the automated assistant (and based on the user's further recitation). In other words, the automated assistant will utilize the interpretation ("change" or "arrange") that conforms to the recited suggestion. For example, even if "arrange" was predicted with only 20% probability and "change" was predicted with 80% probability, "arrange" may nonetheless be utilized if the user further speaks "my desktop file folder". As another example, and as a variant of the "Change" and "Arrange" example, a first suggestion of "please change the thermostat to 75" and a second suggestion of "please arrange my desktop file folder" can be presented. If the user selects the "please arrange my desktop file folder" through touch input, or provides further spoken input such as "please arrange my desktop file folder", or "the second one", then the "arrange" interpretation would be utilized in lieu of the "change" interpretation. In other words, despite "change" initially being selected as the correct interpretation based on the greater probability, "arrange" could nonetheless supplant that selection based on the user selection or further spoken input directed to the "arrange" suggestion. In these and other manners, speech-to-text accuracy can be improved and lesser certainty interpretations can be utilized in certain situations. This can preserve computational resources that might otherwise be expended if the incorrect interpretation of the initial spoken utterance had been selected, and the user had to repeat their initial spoken utterance in an attempt to cause the correct interpretation to be selected. Furthermore, this can reduce an amount of time the user spends engaging with the automated assistant, given that the user would be repeating themselves less, and waiting for the automated assistant to render audible responses.

In some implementations, a provided suggestion element can be used as a basis for biasing speech-to-text processing of a further spoken utterance received responsive to providing of the suggestion. For example, speech-to-text processing can be biased toward term(s) of a provided suggestion element and/or toward term(s) that conform to an anticipated category or other type of content corresponding to the suggestion. For instance: for a provided suggestion of "[musician's name]", speech-to-text processing can be biased toward names of musicians (generally, or to musicians in a library of the user); for a provided suggestion of "at 2:00", speech-to-text processing can be biased toward "2:00" or toward times more generally; for a provided suggestion of "[smart device]", speech-to-text processing can be biased toward names of smart devices of the user (e.g., as ascertained from a stored device topology of the user). Speech-to-text processing can be biased toward certain terms by, for example, selecting a particular speech-to-text model (from a plurality of candidate speech-to-text models) for use in performing the speech-to-text processing, promoting a score of a candidate conversion (generated during the speech-to-text processing) based on the candidate conversion corresponding to the certain term(s), promoting path(s) of a state decoding graph (used in speech-to-text processing) that correspond to the certain term(s), and/or by additional or alternative speech-to-text biasing technique(s). As one example, a user can provide an initial spoken utterance such as, "Assistant, set a calendar event for," and in response to receiving the initial spoken utterance, the automated assistant can cause multiple suggestion elements to appear at a display panel of a computing device. The suggestion elements can be, for example, "August . . . September . . . [Current Month] . . . " etc., and the user can select a particular suggestion element by providing a subsequent spoken utterance such as, "August." In response to determining that the suggestion elements include months of the year, the automated assistant can bias speech-to-text processing, of the subsequent spoken utterance, toward months of the year. As another example, in response to providing a suggestion element that includes (or indicates) a numerical input, speech-to-text processing can be biased toward numbers. In these and other manners, speech-to-text processing of subsequent utterances can be biased in favor of provided suggestion elements, thereby increasing the probability that predicted text, from the speech-to-text processing, is correct. This can mitigate the occurrence of further dialog turn(s) that would otherwise be required if the predicted text were incorrect (e.g., based on further input from the user to correct an incorrect interpretation).

In some implementations, timing for providing suggestion elements for completing a particular request to an automated assistant can be based on a context in which the user initiated the particular request. For instance, when a user has provided at least a portion of a request via a spoken utterance while driving their vehicle, the automated assistant can determine that the user is driving the vehicle and delay displaying suggestions for completing the request. In this way, the user will be less frequently distracted by graphics being presented at a display panel within the vehicle. Additionally, or alternatively, content (e.g., a candidate text segment) of a suggestion element can also be based on the context in which the user initiated the spoken utterance. For example, the automated assistant can determine, with prior permission from the user, that the user has provided a spoken utterance such as, "Assistant, turn on . . . " from their living room. In response, the automated assistant can cause a computing device to generate suggestions elements that identify particular devices within the living room of the user. The suggestion elements can include natural language content such as, "Living Room TV . . . Living Room Lights . . . Living Room Stereo." The user can make a selection of one of the suggestion elements by providing a subsequent spoken utterance such as, "Living Room Lights," and, in response, the automated assistant can cause the living room lights to turn on. In some implementations, the devices that the suggestion elements identify can be based on device topology data that characterizes a relationship between various devices associated with the user, and/or an arrangement of computing devices within a location of the user, such as a home or an office. The device topology data can include identifiers for various areas within the location, as well as device identifies that characterize whether a device(s) is in each area. For instance, the device topology data can identify an area such as a "living room," and also identify devices within the living room, such as a "TV," "Lights," and "Stereo." Therefore, in response to the user providing the aforementioned utterance, "Assistant, turn on," the device topology can be accessed and compared to an area wherein the user is (e.g., identify "living room" based on the utterance being provided via a device defined, by the device topology data, as being in the "living room"), in order to provide suggestions that correspond to particular devices within that area.

In some implementations, actions corresponding to at least a portion of a received request can be performed while suggestion elements are being presented to the user for completing the request. For instance, the user can provide a spoken utterance such as, "Assistant, create a calendar event for . . . " In response, the automated assistant can cause a default calendar, with default content, to be created, and can also cause suggestion elements to be created for completing the request to create the calendar event. For instance, the suggestion elements can include, "Tonight . . . Tomorrow . . . Saturday . . . ," and they can be presented before, during, or after the default calendar event is created. When the user selects one of the suggestion elements, the previously created default calendar event can be modified according to the suggestion element that the user selected.

In some implementations, the automated assistant can provide suggestions for reducing an amount of speech processing and/or an amount of assistant interaction time that is typically associated with certain inputs from the user. For example, when the user completes a dialog session with the automated assistant for creating a calendar event, the automated assistant can nonetheless provide further suggestions. For instance, assume the user provides a spoken utterance such as, "Assistant, create a calendar event for Matthew's birthday, next Monday." In response, the automated assistant can cause the calendar event to be generated, and also cause a suggestion element to be presented, such as "and repeat every year" in order to encourage the user to select the suggestion element, thereby causing the calendar event to be repeated every year. This can reduce a number of anticipated interactions between the user and the automated assistant, as the user would not have to repeatedly make the calendar event each year. This can also teach the user that "and repeat every year" can be provided via voice in the future to thereby enable the user to provide a future spoken input that includes "repeat every year", thereby making such future spoken engagements more efficient. Furthermore, in some implementations, a suggestion element can be suggested as a condensed version of a previously spoken utterance provided by the user. In this way, computational resources, such as power and network bandwidth, can be preserved by reducing a total amount of time the user interacts with their automated assistant.

In some implementations, suggestion elements that are presented to the user can be provided to avoid certain spoken utterances that the user is already familiar with. For instance, when the user has a history of providing spoken utterances such as, "Assistant, dim my lights," the automated assistant may not provide the suggestion "my lights" in response to the user subsequently saying "Assistant, dim . . . " Rather, the user can be presented with other suggestions that they may not be familiar with such as, "my monitor . . . my tablet screen . . . an amount of [color] of my lights." Alternatively, or additionally, the aforementioned suggestions can be presented to the user in situations when the user has provided a spoken utterance that is incomplete (e.g., "Assistant, play . . . ") and in other situations when the user has provided a spoken utterance that is complete (e.g., "Assistant, play some music.").

In various implementations, a user will not explicitly indicate when a spoken utterance is considered by the user to be complete. For example, the user will not press a "submit" button or speak "done", "execute", "complete", or other ending phrase when the spoken utterance is deemed by the user to be complete. Accordingly, in those various implementations graphical suggestion(s) can be presented responsive to an already spoken utterance, and the automated assistant will need to determine whether to provide the user more time to provide a further spoken utterance that conforms to one of the suggestions (or to select one of the suggestions through touch input) and that is a continuance of the already provided spoken utterance, or to instead act upon only the already provided spoken utterance.

In some of those implementations, the automated assistant will act upon only the already provided spoken in response to detecting a duration of lack of spoken input from the user. The duration can be dynamically determined in various implementations. For example, the duration can be dependent on whether the already provided spoken utterance is an "incomplete" request, is a "complete request", and/or can be dependent on characteristic(s) of a "complete request" of the already provided spoken utterance. As mentioned above, a "complete request" is one that, when fully processed by an automated assistant, causes performance of one or more corresponding automated assistant actions, where the performed automated assistant action(s) are not default error type actions (e.g., not an audible response of "sorry, I can't help with that"). An "incomplete request" is one that, when fully processed by an automated assistant, causes performance of a default error type action (e.g., error tone and/or a default spoken response such as "sorry, I can't help with that").

In various implementations, the duration can be greater when the already spoken utterance is an incomplete request as compared to when it is a complete request. For example, the duration can be five seconds when the already spoken utterance is an incomplete request, but can be shorter when the already spoken utterance is a complete request. For instance, suggestions of "calendar entry for [date] at X:00" and "reminder to do X at [time] or [location]" can be presented in response to a spoken utterance of "create a". Since the spoken utterance of "create a" is incomplete, the automated assistant can wait five seconds for a further spoken utterance and, only upon passage of the five seconds without further spoken input, will the automated assistant fully process the incomplete spoken utterance and perform the default error type action. Also, for instance, a suggestion of "for [date] at X:00" can be presented in response to a spoken utterance of "create a calendar entry called call mom". Since the spoken utterance of "create a calendar entry called call mom" is complete (i.e., it would lead to creation of a calendar entry with a title, and optionally to further prompting for date and time specifics), the automated assistant can wait three seconds or other shortened duration for a further spoken utterance and, only upon passage of the three seconds without further spoken input, will the automated assistant fully process the already spoken utterance, create the calendar entry, and optionally further prompt the user to provide a date and/or time for the calendar entry.

As another example, the duration can be shorter for a complete request that includes all mandatory parameters as compared to a duration for a complete request that does not include all mandatory parameters (and that would result in further prompting for the mandatory parameters). For example, a complete request for creating a calendar entry can include mandatory parameters of "title", "date", and "time". A spoken utterance of "create a calendar entry called call mom at 2:00 PM today" includes all mandatory parameters, but a suggestion for optional parameter(s) (e.g., a suggestion of "and repeat daily") can nonetheless be provided. Since all mandatory parameters are included in the spoken utterance, the duration can be shorter than, for example, if the spoken utterance was "create a calendar entry called call mom" that did not include all mandatory parameters (and resulted in suggestion(s) being presented such as "@ X:00 on [date]"). As yet another example, the duration can be shorter for a complete request that results in a specific automated assistant agent being invoked, instead of a general search agent that issues a general search based on the request and display(s) search result(s). For instance, a spoken utterance of "what is time" is a complete request that results in a general search and provision of a search result that provides information related to the concept of "time". A suggestion of "in [city]" can be displayed in response to the spoken utterance and can be displayed for two seconds or other duration. On the other hand, a spoken utterance of "turn on the kitchen lights" is a complete request that invokes a specific automated assistant agent that causes the "kitchen lights" to be turned on. A suggestion of "to X % brightness" can be displayed in response to the spoken utterance, but can be displayed for only one second (or other shortened duration) since the already provided spoken utterance is complete and invokes a specific automated assistant agent (instead of causing performance of a general search).

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
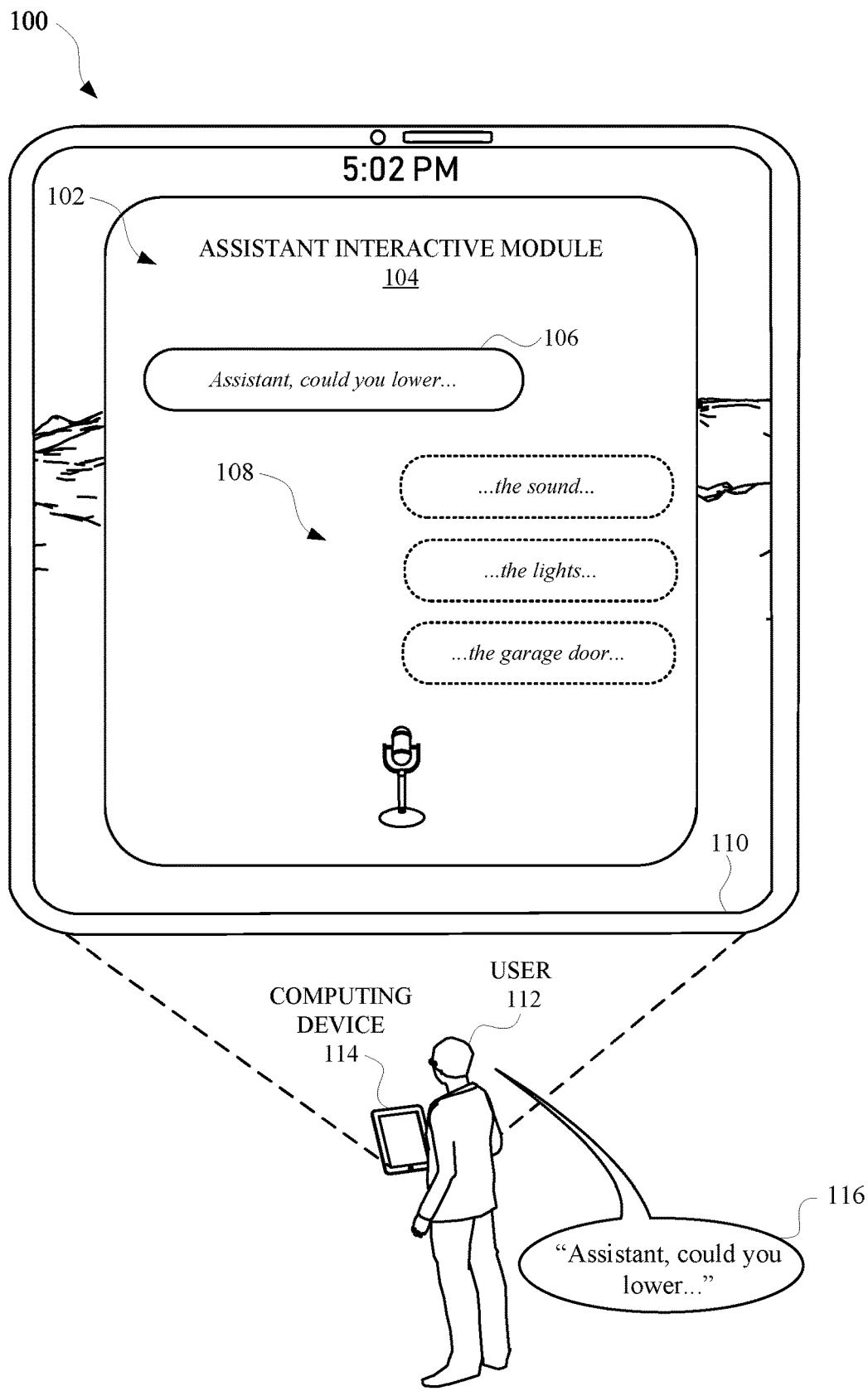
FIG. 1A and FIG. 1B illustrate views of a user providing a spoken utterance and an automated assistant providing suggestions for completing the spoken utterance.
Figure 1B:
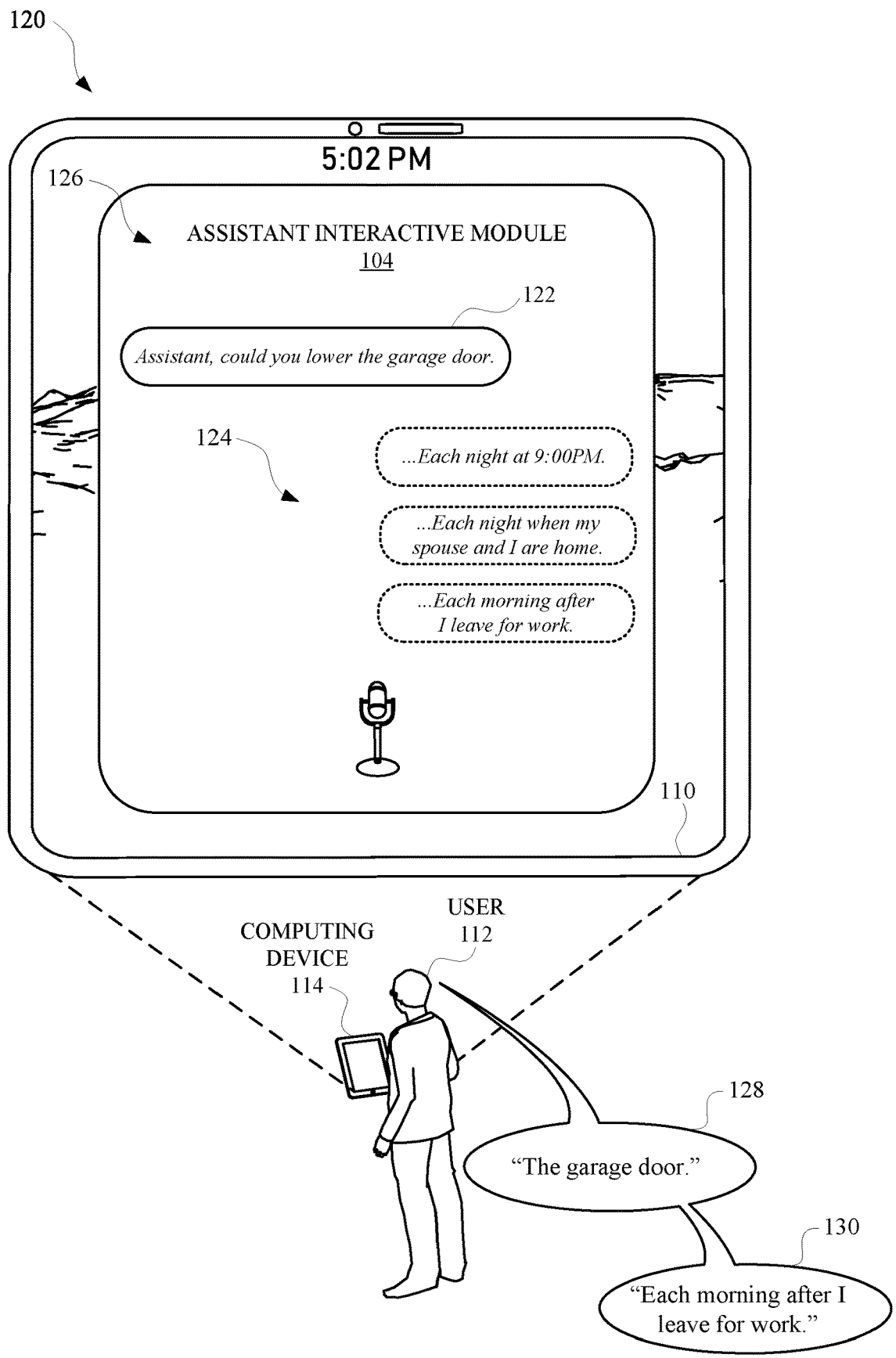

FIG. 1A and FIG. 1B illustrate view 100 and view 120 of a user providing a spoken utterance, and an automated assistant providing suggestions for completing the spoken utterance. The user 112 can provide a spoken utterance 116 to an automated assistant interface of a computing device 114, but the spoken utterance 116 can be incomplete, at least with respect to an automated assistant. For example, the user can provide a spoken utterance 116 such as, "Assistant, could you lower . . . ," which can be processed at the computing device 114 and/or a remote computing device, such as a server device, and graphically rendered at a display panel 110 of the computing device 114. The graphical rendering of the spoken utterance 116 can be presented as a graphical element 106 at an assistant interactive module 104 of the computing device 114. In response to receiving the spoken utterance 116, the computing device can determine that the spoken utterance 116 is an incomplete spoken utterance. An incomplete spoken utterance can be a spoken utterance that does not result in at least one action being performed via the automated assistant, and/or any other application or assistant agent. Alternatively, or additionally, an incomplete spoken utterance can be a spoken utterance that is void of one or more parameter values necessary for a function to be executed, or otherwise controlled. For example, an incomplete spoken utterance can be a spoken utterance that is void of one or more parameter values necessary for an assistant function to be executed via an automated assistant, and therefore requires further or supplemental input from a user or other source.

In response to determining that the spoken utterance 116 is an incomplete spoken utterance, the automated assistant can cause one or more suggestion elements 108 to be presented at a first user interface 102. However, in some implementations, the one or more suggestion elements 108, and/or their content, can be audibly rendered for users that may be visually impaired, or otherwise not readily able to view the first user interface 102. The suggestion elements 108 can include natural language content characterizing candidate text segments, from which the user 112 can: select by tapping on the first user interface 102, verbally reciting the text of a candidate text segments, and/or describing at least one suggestion element 108 as it is presented at the first user interface 102. For instance, instead of providing an additional spoken utterance such as, "the sound," the user 112 can provide a different additional spoken utterance such as, "the first one." Alternatively, if the user wanted to select a different suggestion element 108, the user 112 could provide a touch input to the suggestion element 108 that says "the lights," tap the first user interface 102 at a location corresponding to the desired suggestion element 108, and/or provide a different additional spoken utterance such as, "the second one." In various implementations, one or more of the suggestion elements 108 can be presented with icons and/or other graphical element to indicate the action that would be performed in response to their selection. For example, "the sound" can be presented with a speaker icon, "the lights" can be presented with a light icon, and/or "the garage door" presented with a garage door icon.

Natural language content of the text segments provided with each suggestion element 108 can be generated based on whether the combination of the incomplete spoken utterance 116 and the candidate text segments will cause an automated assistant to perform an action. For example, each candidate text segments can be generated based on whether the combination of the incomplete spoken utterance 116 and of the candidate text segments, when spoken together by the user 112, will cause an action to be performed via the automated assistant. In some implementations, when the user 112 provides a complete spoken utterance, the automated assistant, the computing device 114 and/or an associated server device, can bypass generating suggestion elements 108. Alternatively, when the user 112 provides a complete spoken utterance, the automated assistant, the computing device 114, and/or the associated server device, can generate suggestion elements for provisioning at the first user interface 102.

In some implementations, device topology data can be used as a basis for generating the candidate text segments of the suggestion elements 108. For example, the computing device 114 can have access to device topology data that identifies one or more devices that are associated with the user 112. Furthermore, the device topology data can indicate a location of each device of the one or more devices. A position of the user 112 can be used, with prior permission from the user 112, to determine a context of the user 112, at least as the context characterizes a location of the user 112. The device topology data can be compared to position data in order to determine devices that may be nearby the user 112. Furthermore, once the nearby devices have been identified, a status of each nearby device can be determined in order to compare the natural language content of the incomplete spoken utterance 116 to each status of each nearby device. For example, as illustrated in FIG. 1A, because the user 112 provided a request for the assistant to "lower" something, the devices having statuses that can be modified via an action of "lowering" can be used as a basis for generating the suggestion elements 108. Therefore, if a speaker is playing music nearby, a suggestion of "the sound" can be provided. Furthermore, if flights are on nearby the user, a suggestion of "the lights" can be provided. Additionally, or alternatively, device topology data can characterize devices that may not be nearby the user 112 but may nonetheless be associated with the incomplete spoken utterance 116. For example, the user 112 maybe in their bedroom, but the incomplete spoken utterance 116 can be associated with a garage door in the garage of a home of the user 112. Therefore, the automated assistant can also provide a suggestion element 108 that allows the user to "lower the garage door," despite the user not being in the garage.

FIG. 1B illustrates a view 120 of the user 112 providing an additional spoken utterance 128 in furtherance of selecting a suggestion element 108, which was provided at the first user interface 102, illustrated in FIG. 1A. The user 112 can select one of the previously displayed suggestion elements 108 by providing an additional spoken utterance 128 such as, "The garage door." In response to receiving the spoken utterance at an automated assistant interface of the computing device 114, the candidate text corresponding to the selected suggestion element 108 can be presented adjacent to the natural language content of the incomplete spoken utterance 116. For example, as illustrated in FIG. 1B, completed candidate text 122 can be presented at the second user interface 126 as a combination of natural language content from the incomplete spoken utterance 116 and the selected suggestion element 108 (e.g., the natural language content of the additional spoken utterance 128).

The computing device 114, the automated assistant, and/or the server device, can determine that the additional spoken utterance 128, combined with the initial spoken utterance 116, resulted in a complete spoken utterance. In response, one or more actions can be performed via the automated assistant. For example, when the completed spoken utterance corresponds to the completed candidate text 122, the automated assistant can cause a garage door at the home of the user 112 to electromechanically lower into a closed position. In some implementations, additional suggestion elements 124 can be provided at the second user interface 126, when a complete spoken utterance has been formed and/or when an incomplete spoken utterance has been formed. For example, despite the completed candidate text 122 being actionable by the automated assistant, the computing device 114, the automated assistant, and/or the server device, can cause the additional suggestion elements 124 to be presented at the second user interface 126. As described herein, in various implementations the automated assistant can execute an action based on the completed candidate text 122 (i.e., cause the garage door to be lowered), even without a selection of one of the additional suggestion elements 124, if a duration of time has passed without any further spoken input or any selection of any one of the additional suggestion elements 124. As also described herein, that duration of time can be shorter than a duration of time for which the automated assistant would wait in FIG. 1A. This shorter duration of time can be based on, for example, the completed candidate text 122 being a "complete request", whereas the candidate text 106 (FIG. 1A) is an "incomplete request".

In some implementations, a determination can be made as to whether there exists an additional function or action that could be performed and that is related to the completed candidate text 122. Alternatively, or additionally, determination can be based on whether the additional function or action can reduce any subsequent amount of interaction between the user 112 and the automated assistant, in order to limit an amount of computational resources and/or network resources that may be expended on such interactions. For example, in some implementations, content of the completed candidate text 122 can be compared with content of previous interactions between the user 112 and the automated assistant, and/or previous interactions with one or more other users and the automated assistant, with prior permission from the user 112 and the one or more other users. Furthermore, interaction times between users and their respective automated assistant, when participating in interactions related to the candidate text 122, can be compared. For example, another user may have only interacted with their respective automated assistant by requesting a periodic action be performed, such as requesting that the action be performed in response to a daily activity. Therefore, the amount of time the other user spends interacting with their respective automated assistant, at least as it relates to the subject matter of the candidate text 122, can be relatively less than that of the user 112 who has not requested the periodic and/or conditional action be performed. Therefore, the second user interface 126 can be generated with additional suggestion elements 124 in order that the user may select one or more of the additional suggestion elements 124, thereby resulting in mitigating waste of computational resources and network resources.

For example, if the user 112, selects the first additional suggestion element 124 by speaking the phrase 130, "each morning after I leave for work," the user 112 will not need to be displayed. Furthermore, the spoken utterance 128 will no longer have to be processed, and/or the completed candidate text 122 will no longer need to be generated for display at the computing device 114. Moreover, the user 112 may learn additional conditional statements, such as "each night at 9 P.M.," and, "each night when my spouse and I are home," which may be used to mitigate waste of computational resources related to other commands that the user frequently requests. For example, by seeing the additional suggestion elements 124, the user 112 may remember them and use them later when providing a spoken utterance such as "Assistant, could you turn on the home security system?"

Figure 2A:
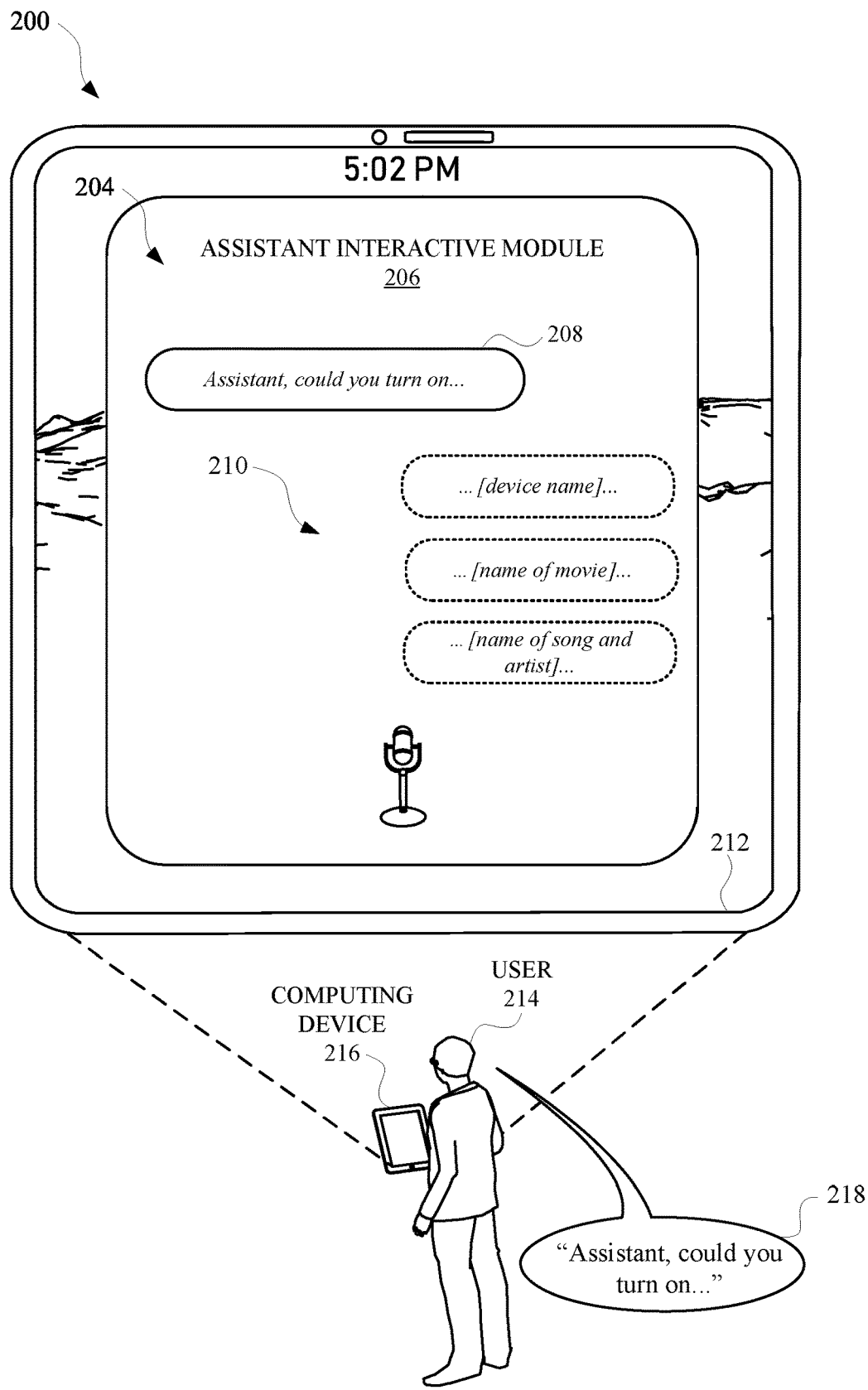
FIG. 2A and FIG. 2B provide views that illustrate a user receiving categorical suggestions in response to a spoken utterance, and/or based on one or more operations of an automated assistant.
Figure 2B:
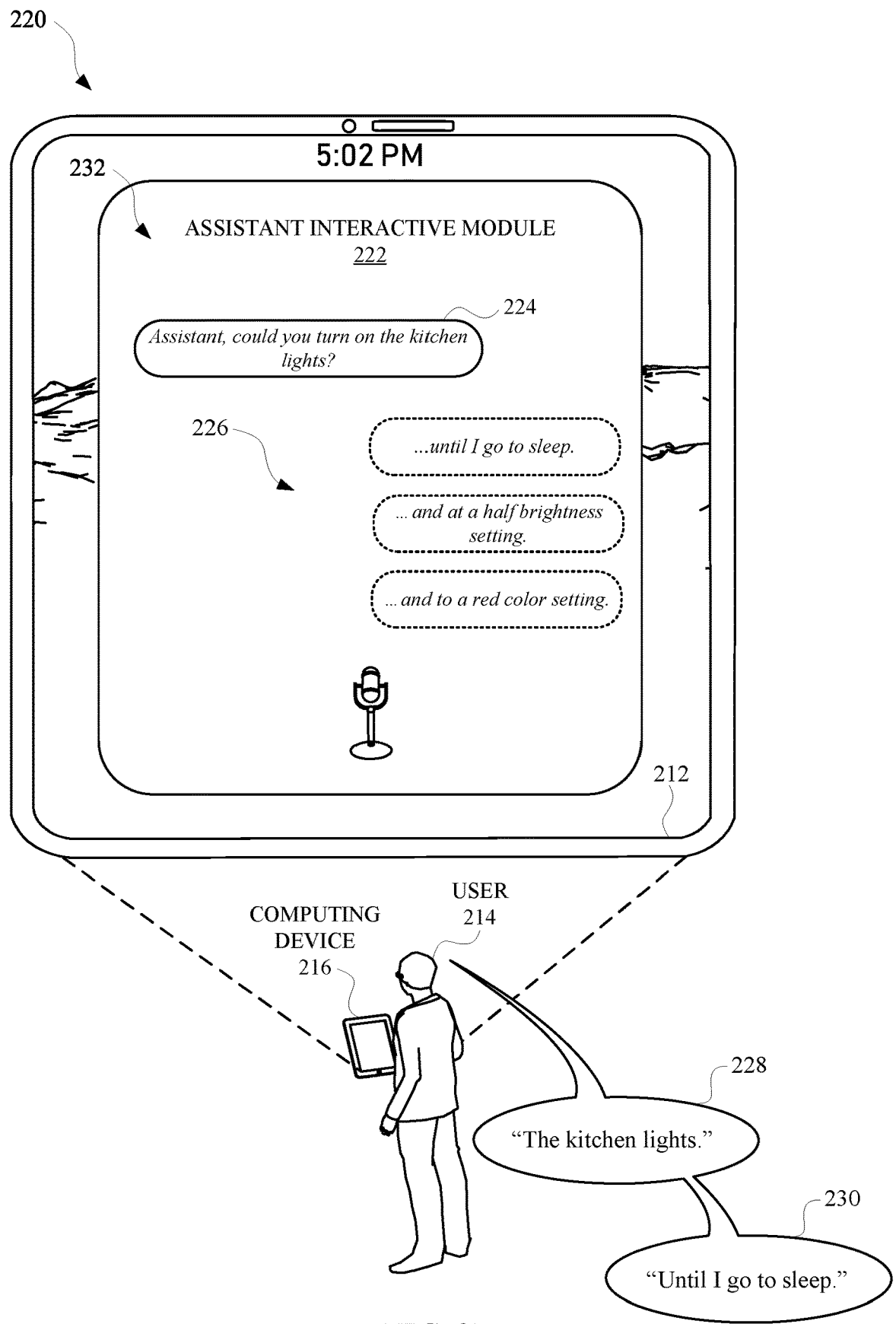

FIG. 2A and FIG. 2B provide view 200 and view 220, which illustrates a user 214 receiving categorical suggestions in response to a spoken utterance 218, and/or based on one or more operations of an automated assistant. As provided in FIG. 2A, the user 214 can provide a spoken utterance 218 to an automated assistant interface of a computing device 216. The spoken utterance 218 can be, for example, "Assistant, could you turn on." In response to receiving the spoken utterance 218, the computing device 216, a remote computing device that is in communication with the computing device 216, and/or the automated assistant, can cause a first user interface 204 to be presented at a display panel 212 of the computing device 216. The first user interface 204 can include an assistant interactive module 206, which can present various graphical elements according to one or more operations of the automated assistant. For example, an interpretation of the spoken utterance 218 can be presented as an incomplete text segment 208 at the first user interface 204.

The first user interface 204 can also include one or more suggestion elements 210, which can include content characterizing candidate categories for additional input to complete the incomplete text segment 208. The candidate categories characterized by the content of the suggestion elements 210 can be based on data from one or more different sources. For example, the content of the suggestion elements 210 can be based on a context in which the user provided the spoken utterance 218. The context can be characterized by contextual data available at the computing device 216, a remote device that is in communication with the computing device 216 (such as a server device), the automated assistant, and/or any other application or device associated with the user 214. For example, device topology data can indicate that the computing device 216 is paired with, or otherwise in communication with, one or more other devices. Based on this device topology data, one or more of the suggestion elements 210 can provide a candidate category such as, "[device name]." Alternatively, or additionally, the data from the one or more sources can include application data that indicates media that the user 214 has recently accessed. When the recent media includes a movie, the suggestion elements 210 can be generated to include content such as, "[name of movie]." Alternatively, or additionally, when the recent media includes music, the suggestion elements 210 can be generated to include content such as, "[name of song and artist]."

FIG. 2B illustrates a view 220 of the user 214 providing an additional spoken utterance 228 for selecting a candidate category from the suggestion elements 210, provided in FIG. 2A. As illustrated, the user 214 can provide the additional spoken utterance 228 of, "the kitchen lights." In response to receiving the additional spoken utterance 228, additional suggestion elements 226 can be presented to the user 214 via the display panel 212. The additional suggestion elements 226 can be presented to the user 214 in response to the user completing the initial spoken utterance 218 by providing the additional spoken utterance 228, or when the additional spoken utterance 228 does not complete the initial spoken utterance 218. In some implementations, the additional suggestion elements 226 can include content such as candidate categories, which can be of similar format to the suggestion elements 210. Additionally, or alternatively, the additional suggestion elements 226 can include content that, when the user speaks, the content of the speech can be used in furtherance of completing, modifying, and/or initializing one or more actions via the automated assistant. Therefore, the assistant interactive module 222 can provide a variety of formats of candidate text segments, which can include candidate categories (e.g., those provided in the suggestion elements 210), candidate requests (e.g., those provided in the additional suggestion elements 226), and/or any other content that can be used for inclusion in a command provided to an automated assistant and/or other application or device.

In some implementations, provisioning of one or more suggestion elements, and/or an order of presentation of the one or more suggestion elements, can be based on a priority that has been assigned to certain content, actions, spoken utterances, candidate text segments, and/or any other data from which a suggestion can be based. For example, in some implementations, provisioning of certain content within a suggestion element 226 can be based on historical data that characterizes previous interactions between the user 214 and the automated assistant, the user 214 and the computing device 216, the user 214 and one or more other devices, the user 214 and one or more other applications, and/or one or more other users and one or more devices and/or applications. For example, in response to receiving the selection of the suggestion element 210 with the content "[device name]," the computing device 216 and/or a server device can access historical data that characterizes previous interactions between the user 214 and one or more devices associated with the user 214. The historical data can be used as a basis to generate the content for the suggestion elements 226. For example, despite the user selecting "the kitchen lights," the historical data can be used to generate suggestions about other devices the user may be interested in controlling and/or other settings (apart from "on") the user may be interested in modifying for the device they did not explicitly select.

As an example, and with prior permission from the user 214, the historical data can characterize one or more previous interactions in which the user 214 turned off their kitchen lights a few minutes before going to sleep. Based on these interactions characterized by the historical data, the automated assistant can assign a highest priority to such interactions as they relate to a complete request 224, such as "Assistant, could you turn on the kitchen lights?" Furthermore, the automated assistant can generate content for a suggestion element 226 such as, "until I go to sleep." Based on the content of the historical data characterizing a highest priority interaction, at least as it relates to the completed request 224, the automated assistant can provide a suggestion element 226, "until I go to sleep," as the highest priority, or highest position, suggestion element 226 at the second user interface 232.

Alternatively, or additionally, when the historical data characterizes one or more previous interactions in which the user 214 requested that the automated assistant turn the kitchen lights to half brightness setting, or a red color setting, but those requests occurred less frequently than the aforementioned request of turning off the lights before going to sleep, the content of those requests can be assigned priorities that are less than the previous priority assigned to the content of the aforementioned request. In other words, because the user 214 has more frequently requested that the kitchen lights be turned off when they go to sleep, the suggestion element "until I go to sleep" will be prioritized and/or otherwise have a higher position than the other suggestion elements, such as "and at a half brightness setting" and/or "and to a red color setting." In some implementations, content of a suggestion element can be based on functionality of a device or an application that the user 214 has not used before, and/or one or more updates pushed by a third-party entity to an application or a device. The term third-party entity can refer to an entity that is different from a manufacturer of the computing device 216, the automated assistant, and/or a server device that is in communication with the computing device 216. Therefore, when the manufacturer (i.e. a third party entity) of the kitchen lights pushes an update that allows the kitchen lights to operate according to a red color setting, the automated assistant can access data characterizing this update, and generate the suggestion element 226, "and to a red color setting," based on the update provided by the third party manufacturer (i.e. the third party entity).

Alternatively, or additionally, the content of the suggestion element 226, that is based on the update, can be assigned a priority that is less than another priority assigned to content corresponding to another suggestion element 226 that is based on one or more actions the user 214 frequently requests be performed. However, the content that is based on the update can be assigned a higher priority than content that the user 214 has been presented with before, via the display panel 212 and/or via the automated assistant, but elected not to select the content that was presented before. In this way, suggestion elements provided to the user can be cycled, according to assigned priorities, in order to adapt suggestions for the user. Furthermore when those suggestions relate to reducing interaction X between the user 214 and the automated assistant, computational resources and network resources can be preserved by providing more suggestions that reduce such interactions while limiting suggestions that do not reduce such interactions, or are otherwise not relevant to the user.

Figure 3:
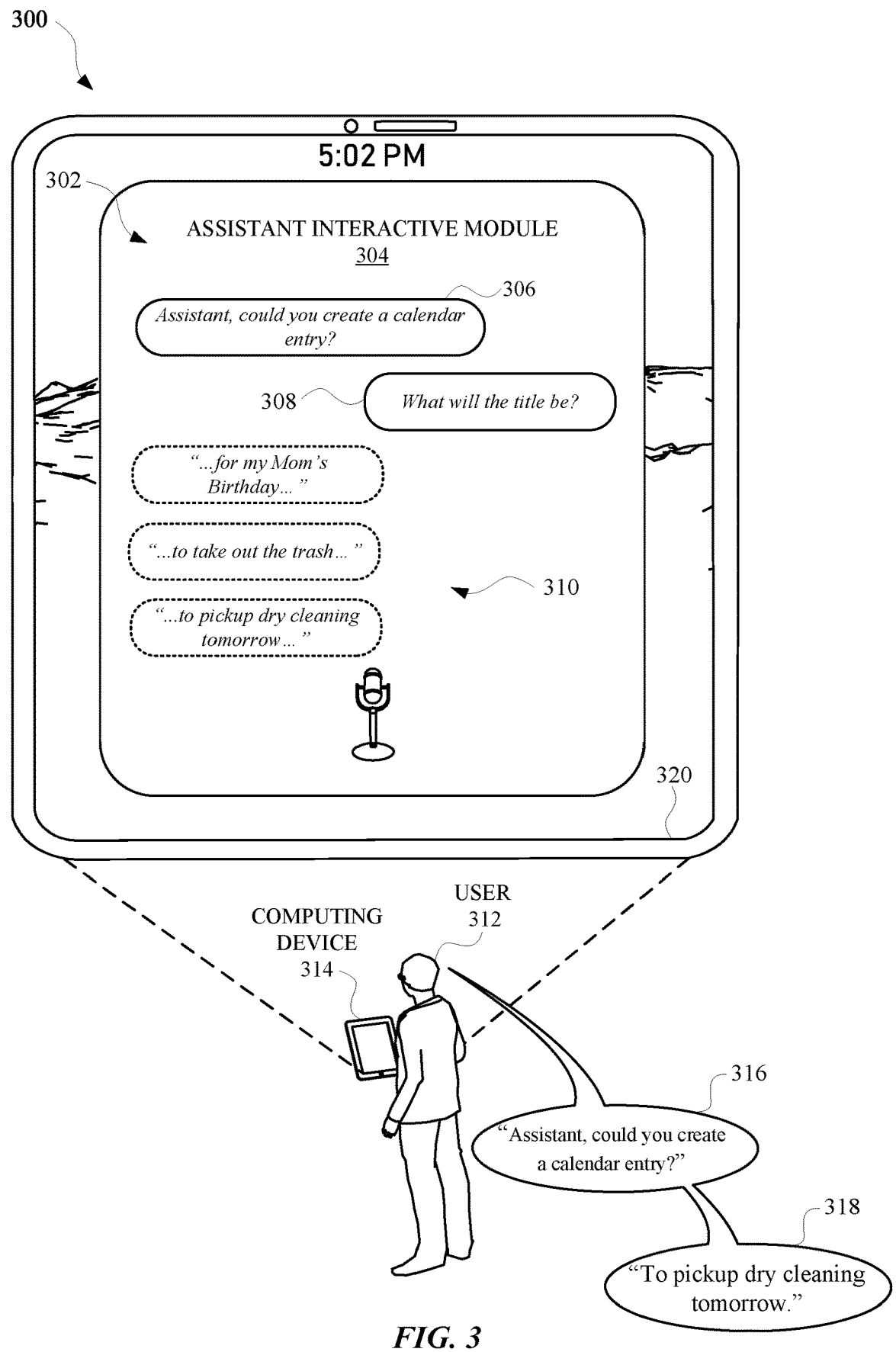
FIG. 3 illustrates a view of a user receiving suggestions for completing a spoken utterance, in lieu of audible prompts being rendered by an automated assistant.

FIG. 3 illustrates a view 300 of a user 312 receiving suggestions for completing a spoken utterance 316, in lieu of audible prompts being rendered by an automated assistant. The user 312 can provide a spoken utterance 316 such as, "Assistant, could you create a calendar entry?" In response, an assistant interactive module 304, which can be controlled via an automated assistant, can provide a graphical representation 306 of the spoken utterance 316, and the graphical representation 306 can be presented at a display panel 320 of a computing device 314.

The spoken utterance 316 can correspond to a request for a function to be executed, and that function can have one or more mandatory parameters, which must be specified by the user 312, or otherwise fulfilled by one or more available values. In order to prompt the user to provide one or more values for fulfilling the one or more mandatory parameters, the automated assistant can optionally provide a graphical prompt 308 requesting a value for a particular parameter. For example, the prompt 308 can include content such as, "What will the title be?" thereby indicating that the user 312 must provide a title for the calendar entry. However, in order to preserve power and computational resources of the computing device 314, the automated assistant can cause the computing device 314 to bypass rendering an audible prompt for the user 312. Furthermore, this can save delay times, because the user 312 would not have to wait for the audible prompt to be fully rendered.

In lieu of the automated assistant bypassing providing an audible prompt, the automated assistant can generate one or more suggestion elements 310, which can be based on the one or more mandatory parameters for the function requested by the user 312. For example, because the function corresponds to generating a calendar entry, and a parameter to be fulfilled is a "title" of the calendar entry, the suggestion elements 310 can include title suggestions for the calendar entry. For example, content of the suggestions can include, "For my Mom's birthday," "To take out the trash," and "To pick up dry cleaning tomorrow."

In order to select one of the suggestion elements 310, the user 312 can provide an additional spoken utterance 318, which identifies content of at least one suggestion element 310. For instance, the user 312 can provide the additional spoken utterance 318 of, "To pick up dry cleaning tomorrow." As a result, and from the perspective of the computing device 314 and/or the automated assistant, the only dialogue rendered during the interaction between the user 312 and the automated assistant would have been rendered by the user 312. Therefore, no rendering of audio would be necessary or otherwise employed by the automated assistant. Furthermore, in response to the user providing the additional spoken utterance 318, a different prompt can be provided at the display panel 320 in order to request that the user 312 provide a value for another parameter, should it be necessary for the requested function. Furthermore, when another parameter is required for the function, different suggestion elements can be presented at the display panel 320 with different content. Moreover, the subsequent prompt and the subsequent suggestion elements can be presented without any audio being rendered at the computing device 314 or otherwise via the automated assistant. Therefore, the user 312 would seemingly be providing an ongoing spoken utterance while simultaneously viewing the display panel 320, in order to identify content from which to further complete the original function they requested.

Figure 4:
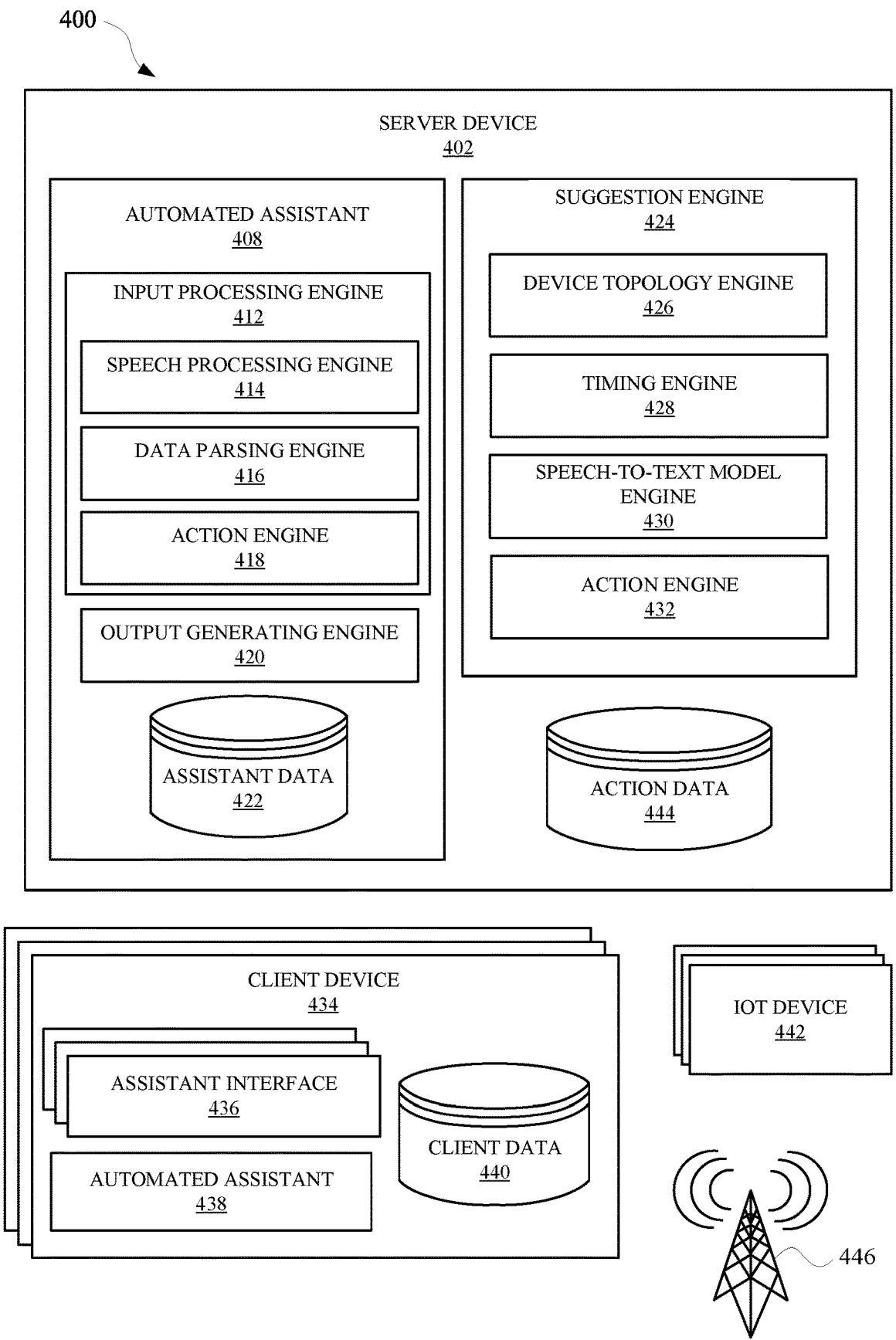
FIG. 4 illustrates a system for providing suggestions, via a display modality, and completing a spoken utterance via an automated assistant.

FIG. 4 illustrates a system 400 providing suggestions, via a display modality, for completing a spoken utterance via an automated assistant 408. In some implementations, suggestions can be provided to a user for the user to complete the spoken utterance, or at least supplement their previous spoken utterance. In some implementations, the suggestion can be provided in order to reduce a frequency and/or a length of time that the user will participate in subsequent dialog sessions with the automated assistant.

The automated assistant 408 can operate as part of an automated assistant application that is provided at one or more computing devices, such as a client device 434, and/or a server device 402. A user can interact with the automated assistant 408 via one or more assistant interfaces 436, which can include one or more of a microphone, a camera, a touch screen display, a user interface, and/or any other apparatus capable of providing an interface between a user and an application. For instance, a user can initialize the automated assistant 408 by providing a verbal, textual, and/or a graphical input to the assistant interface to cause the automated assistant 408 to perform a function (e.g., provide data, control a device (e.g., control an IoT device 442, access an agent, modify a setting, control an application(s), etc.). The client device 434 and/or the IoT device 442 can include a display device, which can be a display panel that includes a touch interface for receiving touch inputs and/or gestures for allowing a user to control applications of the client device 434 and/or the server device 402 via the touch interface. The touch inputs and/or other gestures (e.g., spoken utterances) can also allow a user to interact with the automated assistant 408, the automated assistant 438, and/or the IoT device 442 via the client device 434.

In some implementations, the client device 434 and/or the IoT device 442 can lack a display device but include an audio interface (e.g., a speaker and/or a microphone), thereby providing an audible user interface output, without providing a graphical user interface output, as well as providing a user interface, such as a microphone, for receiving spoken natural language inputs from a user. For instance, in some implementations, the IoT device 442 can include one or more tactile input interfaces, such as one or more buttons, and omit a display panel that would be provided graphical data from a graphics processing unit (GPU). In this way, energy and processing resources can be saved compared to a computing device that includes a display panel and GPU.

The client device 434 can be in communication with the server device 402 over a network 446, such as the internet. The client device 434 can offload computational tasks to the server device 402 in order to preserve computational resources at client device 434 and/or the IoT device 442. For instance, the server device 402 can host an automated assistant 408, and the client device 434 can transmit inputs received at one or more assistant interfaces, and/or a user interface 444 of the IoT device 442, to the server device 402. However, in some implementations, the automated assistant 408 can be hosted at the client device 434. In various implementations, all or less than all aspects of the automated assistant 408 can be implemented on the server device 402 and/or the client device 434. In some of those implementations, aspects of the automated assistant 408 are implemented via a local automated assistant 438 of the client device 434 and interface with the server device 402, which can implement other aspects of the automated assistant 408. The server device 402 can optionally serve a plurality of users and their associated assistant applications via multiple threads. In implementations where all or less than all aspects of the automated assistant 408 are implemented via a local automated assistant 438 of the client device 434, the local automated assistant 438 can be an application that is separate from an operating system of the client device 434 (e.g., installed "on top" of the operating system)—or can alternatively be implemented directly by the operating system of the client device 434 (e.g., considered an application of, but integral with, the operating system).

In some implementations, the automated assistant 408 and/or automated assistant 438 can include an input processing engine 412, which can employ multiple different engines for processing inputs and/or outputs for the client device 434, the server device 402, and/or one or more IoT devices 442. For instance, the input processing engine 412 can include a speech processing engine 414 that can process audio data received at an assistant interface 436 to identify the text embodied in the audio data. The audio data can be transmitted from, for example, the client device 434 to the server device 402 in order to preserve computational resources at the client device 434.

The process for converting the audio data to text can include a speech recognition algorithm, which can employ neural networks, word2vec algorithms, and/or statistical models for identifying groups of audio data corresponding to words or phrases. The text converted from the audio data can be parsed by a data parsing engine 416 and made available to the automated assistant 408 as textual data that can be used to generate and/or identify command phrases from the user. In some implementations, output data provided by the data parsing engine 416 can be provided to an action engine 418 to determine whether the user has provided an input that corresponds to a particular action and/or routine capable of being performed by the automated assistant 408 and/or an application, agent, and/or device that is capable of being accessed by the automated assistant 408. For example, assistant data 422 can be stored at the server device 402 and/or the client device 434, as client data 440, and can include data that defines one or more actions capable of being performed by the automated assistant 408, as well as parameters involved in performing those actions.

When the input processing engine 412 has determined that a user has requested a particular action or routine be performed, the action engine 418 can determine one or more parameters for the particular action or routine, and an output generating engine 420 can then provide an output to the user based on the particular action, routine, and/or the one or more parameters. For instance, in some implementations, in response to a user input, such as a gesture directed at the assistant interface 436, the automated assistant 438 can cause data, which characterizes the gesture, to be transmitted to the server device 402 for determining the action that the user is intending the automated assistant 408 and/or automated assistant 438 to perform.

The client device(s) 434 and/or the IoT device(s) 442 can include one or more sensors, respectively, capable of providing an output in response to a user input from a user. For instance, the one or more sensors can include an audio sensor (i.e., an audio-responsive device) that provides an output signal in response to an audio input from the user. The output signal can be transmitted, via a communication protocol such as Bluetooth, LTE, Wi-Fi, and/or any other communication protocol, to the client device 434, the server device 402, the IoT device 442. In some implementations, the output signal from a client device 434 can be converted into user input data by one or more processors of the client device 434. The user input data can be transmitted to the IoT device 442 (e.g., Wi-Fi capable light bulbs) via a communication protocol, and either be processed at the client device 434 and/or transmitted via the network 446 to the server device 402. For instance, the client device 434 and/or the server device 402 can determine, based on the user input data, a function of the IoT device 442 that is to be controlled via the user input data.

A user may provide an input, such as a spoken utterance, that is received at the assistant interface 436, and is provided by the user in furtherance of controlling an IoT device 442, a client device 434, the server device 402, an automated assistant, an agent assistant, and/or any other device or application. In some implementations, the system 400 can provide suggestions to the user on how to complete the spoken utterance, supplement the spoken utterance, and/or otherwise assist the user. For example, the user can provide an incomplete spoken utterance with the intention of causing the IoT device 442 to perform a particular function. The incomplete spoken utterance can be received at the assistant interface 436, converted to audio data, and the audio data can be transmitted to the server device 402 for processing. The server device 402 can include a suggestion engine 424 that can receive the audio data, or other data that is based on the incomplete spoken utterance, and determine one or more suggestions for completing, or otherwise supplementing, the incomplete spoken utterance.

In some implementations, a timing for providing one or more suggestion elements and a display panel of a client device 434 and/or an IoT device 442, can be determined by a suggestion engine 424. The suggestion engine 424 can include a timing engine 428, which can determine when the user should be presented with one or more suggestions for additional spoken utterances. In some implementations, one or more thresholds can be characterized by action data 444 that is available to the suggestion engine 424. For example, the action data 444 can characterize a threshold value corresponding to a time that a user may delay after providing a portion of a spoken utterance. Should a user delay, after the user has provided an incomplete spoken utterance, an amount of delay time can be compared to the threshold value characterized by the action date of 444. When the delay satisfies the threshold value, the timing engine 428 can cause one or more suggestion elements to be presented to the user for completing the incomplete spoken utterance.

In some implementations, the timing engine 428 can adapt a value for delay time between a user providing an incomplete spoken utterance and receiving a suggestion for completing the spoken utterance. For example, the suggestion engine 424 can determine a context of the user, based on contextual data embodied in the assistant data 422, action data 444 and/or the client data 440, and use the context as a basis for determining the value for the delay time. For example, when the user is in a first context, characterized by the user being at home watching TV, the timing engine 428 can set the delay time to a first value. However, when the user is in a second context characterized by the user driving and interacting with a vehicle computing device, the timing engine 428 can set the delay time to a second value that is greater than the first value. In this way, suggestion elements for completing a spoken utterance can be relatively delayed in order to limit distracting the user while they are driving.

In some implementations, a value for the delay time can be proportional to, or adapted according to, how often the user provides incomplete spoken utterances overtime. For example, initially when a user begins interacting with the automated assistant, they can provide X number of incomplete spoken utterances per period Y. Sometime thereafter, the user can have a history of providing Z number of incomplete utterances Y. If Z is less than X, the timing engine 428 can cause a value for the delay time threshold to increase over time. Therefore, as the delay time threshold increases, computational resources at the server device 402 and/or the client device 434 can be preserved, as there will be less changes to what is presented at a display panel over time, thereby reducing a load on the GPU responsible for processing graphical data for the display panel.

In some implementations, the suggestion engine 424 can include a speech-to-text model engine 430, which can select a speech-to-text model from multiple different speech-to-text models according to an expected spoken utterance(s) from the user. Additionally, or alternatively, the speech-to-text model engine 430, can select a speech-to-text model from multiple different speech-to-text models according to an expected type of spoken utterance(s) from the user. Alternatively, or additionally, the speech-to-text model engine 430 can bias a selected speech-to-text model based on the expected spoken utterance(s) from the user. In some implementations, when a suggestion element provided to the user includes content that has at least some numerical text, the speech-to-text model engine 430 can, based on the content, select a speech-to-text model that is adapted for processing spoken utterances that characterize numerical information. Alternatively, or additionally, when the suggestion element provided to the user includes content that includes at least a proper noun, such as a name of a city or person, the speech-to-text model engine 430 can bias a selected speech-to-text model to more readily interpret proper nouns. For example, the selected speech-to-text model can be biased such that an error rate that would otherwise occur from processing the proper nouns is reduced. This can eliminate latency that may otherwise occur, and/or can reduce a frequency of unrelated suggestions from the suggestion engine 424.

In some implementations, content of each suggestion of one or more suggestion elements provided to a user in response to an incomplete spoken utterance, or a complete spoken utterance, can be based on a context of the user. For instance, a context of the user can be characterized by data generated by a device topology engine 426. A device topology engine 426 can identify a device that received an incomplete or complete spoken utterance from the user, and determine information associated with that device, such as other devices that are connected to the receiving device, a location of the receiving device relative to other devices, and identifier for the receiving device, one or more different users associated with the receiving device, functionality of the receiving device, functionality of one or more other devices that are paired with or otherwise in communication with the receiving device, and/or any other information that can be associated with a device that received a spoken utterance. For example, when the receiving device is a standalone speaker device located in a living room of a home of the user, the device topology engine 426 can determine that the standalone speaker device is in the living room, and also determine other devices that are located within the living room.

A suggestion engine 424 can use the information, such as descriptions of the other devices in the living room, in order to generate suggestion elements to be presented to the user. For example, in response to the standalone speaker device receiving an incomplete spoken utterance from the user, the device topology engine 426 can determine that a television is in the living room with the standalone speaker device. The suggestion engine 424 can generate content for suggestion elements for completing the incomplete spoken utterance based on determining that the television is in the same room. For instance, when the incomplete spoken utterance is: "Assistant, change," the content of a suggestion element can include "the channel on the television." Alternatively, or additionally, the device topology engine 426 can determined that the television is in the same room as the standalone speaker device, and also determine that the standalone speaker device is not capable of graphically representing the suggestion elements, but that the television is capable of graphically representing the suggestion elements. Therefore, in response to the incomplete spoken utterance, the suggestion engine 424 can cause the television display panel to present one or more suggestion elements that includes content such as, "Change the channel of my television." When the user recites the content of the suggestion element, "Change the channel of my television," an automated assistant can cause the television channel to change, while also generating additional suggestion elements, which can be presented simultaneous to the new television channel being rendered at the television.

In some implementations, data such as assistant data 422, action data 444, and/or client data 440 can characterize past interactions between the user and the automated assistant 408 and/or automated assistant 438. The suggestion engine 424 can use the aforementioned data to generate content for suggestion elements that are presented to the user in response to an incomplete spoken utterance, or a complete spoken utterance, being provided to an assistant interface 436. In this way, should the user temporarily forget certain preferred commands, natural language text can be provided via a suggestion element in order to remind the user of their particular preferred commands. Such preferred commands can be identified by comparing content previously received incomplete, or complete, spoken utterance, and comparing the content to previous natural language inputs received from the user. Natural language inputs that occur most frequently can be considered as corresponding to preferred commands. Therefore, when content of a complete or incomplete spoken utterance corresponds to such natural language inputs, suggestion elements can be rendered and/or generated based on content of those natural language inputs. Furthermore, by identifying natural language inputs that are processed most frequently, and/or identifying preferred commands relative to a particular user, the suggestion engine 424 can provide suggestions to the user that are based on commands that have been most frequently, and most successfully performed, via the automated assistant. Therefore, as a result of providing such suggestions, computational resources can be preserved as processing of least successful commands would be reduced.

Figure 5:
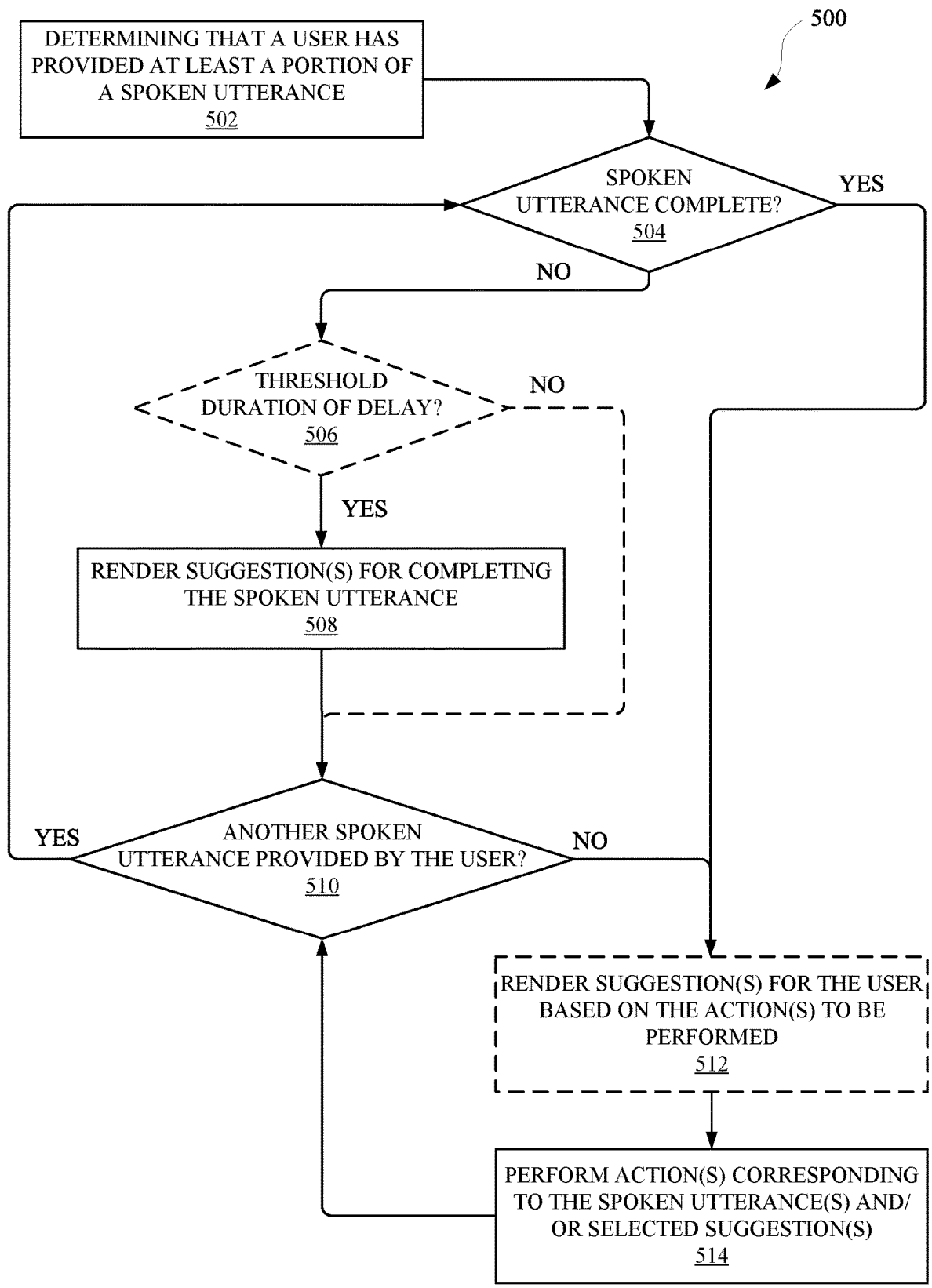
FIG. 5 illustrates a method for providing one or more suggestion elements for completing and and/or supplementing a spoken utterance provided by a user to an automated assistant, a device, an application, and/or any other apparatus or module.

FIG. 5 illustrates a method 500 for providing one or more suggestion elements for completing and and/or supplementing a spoken utterance provided by a user to an automated assistant, a device, an application, and/or any other apparatus or module. The method 500 can be performed by one or more computing devices, applications, and/or any other apparatus or module that can be associated with an automated assistant. The method 500 can include an operation 502 of determining that a user has provided at least a portion of a spoken utterance. The spoken utterance can be a verbal natural language input, audibly provided by the user to one or more automated assistant interfaces of one or more computing devices. A spoken utterance can comprise one or more words, one or more phrases, or any other composition of spoken natural language. For example, an automated assistant interface can include a microphone, and the computing device can be a smart device that includes a touch display panel, which can also operate as another automated assistant interface. In some implementations, the computing device, or a server device that is in communication with the computing device, can determine that the user has provided the spoken utterance.

The method 500 can further include an operation 504 of determining whether the spoken utterance is complete. Determining whether a spoken utterance is complete can include determining whether each parameter of one or more parameters of a function has an assigned value. For example, when the spoken utterance is, "Assistant, turn down," the user may be requesting that an action of turning down an output modality of a device be executed. The action can correspond to a function, such as a "volume down" function or a "brightness down" function, and those functions can require that the user specify a device name. Alternatively, or additionally, determining whether a spoken utterance is complete can include determining whether the automated assistant can perform an action in response to receiving the spoken utterance.

Optionally, the operation 504 can include determining whether certain categories of actions can be performed in response to the spoken utterance, in order to determine whether the spoken utterance is complete. For example, an action such as the automated assistant asking the user to repeat what they said for clarity, can be considered not indicative of the user having provided a complete spoken utterance, despite the automated assistant responding to the spoken utterance. However, actions such as performing a web query, controlling another device, controlling an application, and/or otherwise requesting the automated assistant to perform an intended action can be considered a complete spoken utterance. For example, in some implementations, a spoken utterance can be considered complete when at least one request is identified from the spoken utterance, and the request is capable of being performed via the automated assistant.

When the spoken utterance is determined to be complete (e.g., "Assistant, turn down the television"), the method 500 can proceed to an optional operation 512 of rendering and/or generating suggestion(s) for the user based on the action(s) to be performed, and/or an operation 514 of performing the action(s) corresponding to the spoken utterance(s). For example, the computing device, which received the spoken utterance via an automated assistant interface, can initialize performance of the action or actions specified via the spoken utterance. However, when the spoken utterance is determined to be incomplete, the method 500 can proceed to an operation 506.

The operation 506 can be an optional operation that includes determining whether a threshold duration of delay has transpired after the incomplete spoken utterance. For example, whether a duration of spoken input silence satisfies the threshold can be determined, with permission from the user, further based on: the user that is providing the spoken utterance, a context of the user, and/or any other information associated with the incomplete spoken utterance. When the amount of spoken input silence satisfies the threshold duration of delay, the method 500 can proceed to an operation 508. However, if the amount of spoken input silence does not satisfy the threshold duration of delay, the method 500 can proceed to an operation 510.

The method 500 can optionally proceed from the operation 504 to the operation 508, or optionally proceed from the operation 504 to the operation 506. When the threshold duration of delay is determined to be satisfied at the operation 506, the method 500 can proceed to the operation 508 of rendering one or more suggestions for completing the spoken utterance. Content of the one or more suggestions for completing the spoken utterance can be based on the user who provided the incomplete spoken utterance, content of the incomplete spoken utterance, a context in which the spoken utterance was provided, data representing device topology associated with a device that received the spoken utterance, historical interaction data that characterizes previous interactions between the user and the automated assistant (or one or more users and an automated assistant), and/or any other information from which a suggestion can be faced. For example, when the incomplete spoken utterance is, "Assistant, turn down," content of the suggestions provided to the user can include, "the television," which can be based on device topology data indicating that the television and/or the user are located in the same room as the computing device that received the incomplete spoken utterance. Alternatively, when the incomplete spoken utterance is, "Assistant, send a message to," the content of the suggestions provided to the user can be based on historical interaction data that characterizes previous dialog sessions in which the user requested the automated assistant to send messages to the users spouse and brother. Therefore, content of the suggestions can include, "my brother," and, "my wife." In some implementations, content of the one or more suggestion elements can be determined and/or generated subsequent to the operation 502, but before the optional operation 506, and before the operation 508.

The method 500 can proceed, from the operation 506 or the operation 508, to an operation 510 of determining whether another spoken utterance has been provided by the user. For example, the user can provide an additional spoken utterance after providing an incomplete spoken utterance. In such a case, the method 500 can proceed from the operation 510 back to the operation 504. For example, the user can provide an additional spoken utterance corresponding to content of a suggestion element, thereby indicating to the automated assistant that the user has selected the suggestion element. This can result in a compilation of spoken utterances, which can be composed of the initial incomplete spoken utterance and the additional spoken utterance corresponding to the content of a suggestion element that the user selected. This compilation of spoken utterances can undergo the operation 504 of determining whether the compilation of spoken utterances corresponds to a complete spoken utterance. In implementations, at operation 510 the system can await another spoken utterance for a duration and, if no other spoken utterance is received in the duration, can proceed to operation 514 (or 512). If another spoken utterance is received in the duration, the system can proceed back to operation 504. In some of those implementations, the duration can be dynamically determined. For example, the duration can be dependent on whether the already provided spoken utterance is an "incomplete" request, is a "complete request", and/or can be dependent on characteristic(s) of a "complete request" of the already provided spoken utterance.

When the compilation of spoken utterances corresponds to a complete spoken utterance, the method 500 can proceed to the optional operation 512 and/or the operation 514. However, if the compilation of spoken utterances is not determined to be a complete spoken utterance, the method 500 can optionally proceed to the operation 506 and/or optionally proceed to the operation 508. For example, when the method 500 proceeds again to the operation 508, suggestions for completing the spoken utterance can be based on at least the content of the compilation of spoken utterances. For instance, if the user select the suggestion "my brother," the combination of the incomplete spoken utterance "Assistant, send a message to," and "my brother" can be used as a basis for provided further suggestions. In this way, cycles of suggestions can be provided as the user continues to select suggestions for completing their respective spoken utterance. For instance, a subsequent suggestion can include "I'm on my way," based on historical interaction data that indicates the user has previously sent that same message to the user via an application that is separate from the automated assistant.

In some implementations, the method 500 can proceed from the operation 510 to an optional operation 512 of rendering suggestions for the user based on the actions to be performed. For example, when the automated assistant is requested to perform an action such as turning on an alarm system for the user, the action and/or any information associated with the action can be used as a basis for providing additional suggestion elements for the user to select from. For example, if the complete spoken utterance to be executed via the automated assistant is, "Assistant, turn on my alarm system," one or more other suggestion elements can be rendered at operation 512 and include content such as, "and set my alarm for," "turn off all my lights," "and turn on my audiobook," and/or any other suitable suggestion content for the user. In implementations, at operation 512 the system proceeds to operation 514 in response to receiving further spoken input, or in response to no other spoken utterance being received in a duration. In some of those implementations, the duration can be dynamically determined. For example, the duration can be dependent on whether the already provided spoken utterance(s) constitute an "incomplete" request, a "complete request", and/or can be dependent on characteristic(s) of a "complete request" of the already provided spoken utterance(s).

In some implementations, suggestions can be rendered and/or generated in order to reduce an amount of interaction between the user and the automated assistant, thereby conserving power, computational resources, and/or network resources. For example, content of the supplemental suggestion elements rendered at the operation 512 can include, "each night after 10:00 PM." In this way, if the user is determined to have selected (e.g., via another spoken utterance) the supplemental suggestion element, as determined at the operation 510, the method 500 can proceed to the operation 504, and subsequently to the operation 514, to cause the automated assistant to generate a setting in which the alarm system is turned on every night after 10:00 PM. Therefore, during subsequent evenings, the user does not have to provide the same initials spoken utterance of, "Assistant, turn on . . . ," but rather, can rely on the setting that they just employed via the selected other suggestion element.

The method 500 can proceed from the operation 510 to the optional operation 512 and/or to the operation 514, when the user has not provided an additional spoken utterance after the initial and complete spoken utterance, or has otherwise indicated that they would prefer one or more commands corresponding to the compilation of spoken utterances be executed. For example, when the user has provided the spoken uttering such as, "Assistant change the," and subsequently selected a suggestion element that includes content such as, "channel of the television," the user may elect to have that request be executed despite not specifying a specific channel to change the television to you. As a result, and operation 514, the television channel can be changed, despite the user not selecting any supplemental suggestion elements for further narrowing the instructions of the results in command (e.g., the channel change can be based on a learned preference, of the user, derived from historical interaction data).

Figure 6:
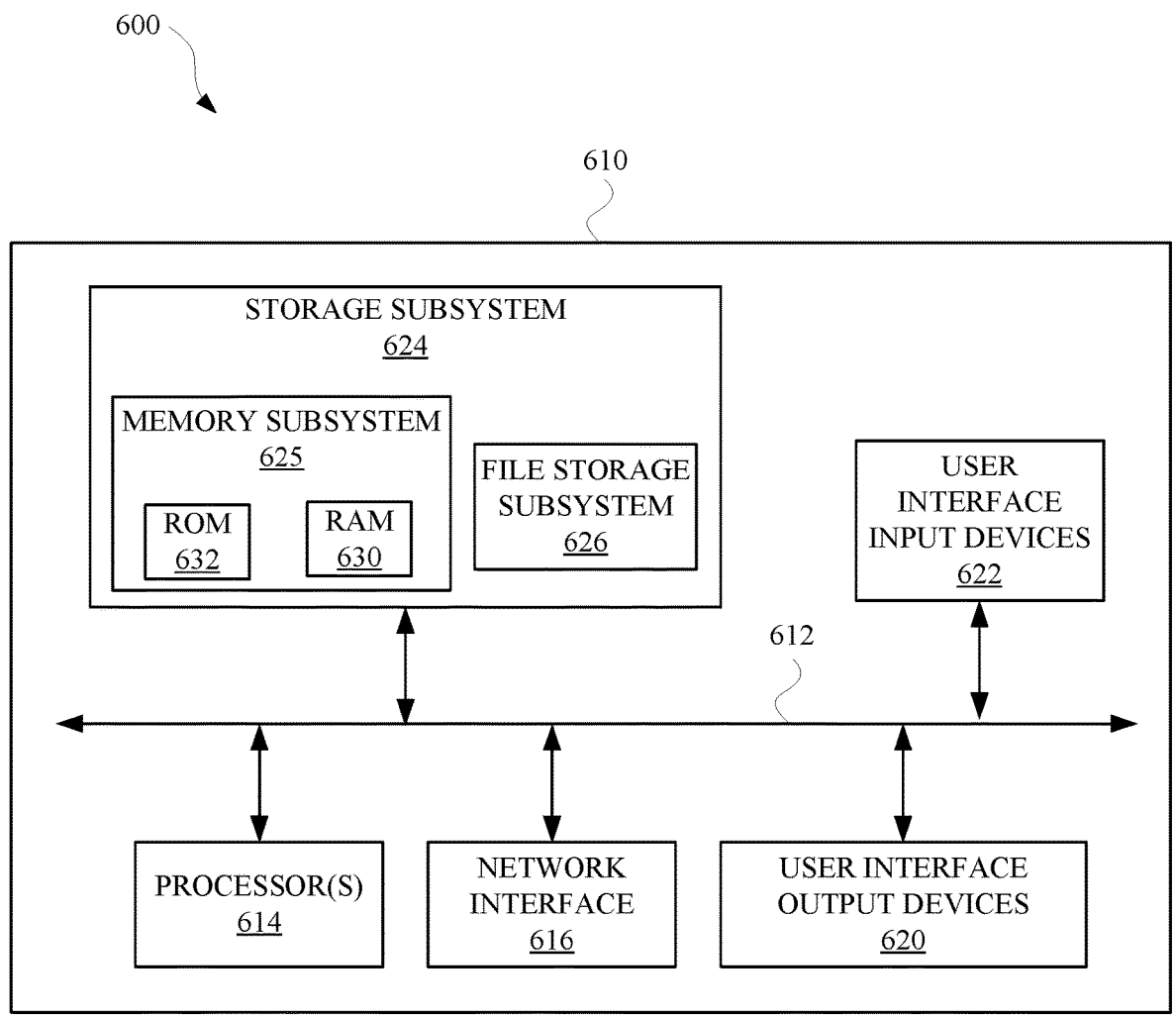
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRD), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, and/or the computing device 114, server device, computing device 216, assistant interaction module, client device(s) 434, computing device 314, server device(s) 402, IoT device(s) 442, automated assistant 408, automated assistant 434, automated assistant(s), and/or any other device, apparatus, application, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes performing speech-to-text processing on data that characterizes a spoken utterance provided by a user. The spoken utterance includes natural language content and is received via an automated assistant interface of a computing device that is connected to a display panel. The method further includes determining, based on performing the speech-to-text processing on the data that characterizes the spoken utterance, whether the spoken utterance is complete, which includes at least determining whether an automated assistant can cause one or more actions to be accomplished based on the natural language content. The method further includes, when the spoken utterance is determined to be incomplete: causing, in response to determining that the spoken utterance is incomplete, the display panel of the computing device to provide one or more suggestion elements. The one or more suggestion elements include a particular suggestion element that provides, via the display panel, other natural language content that, when spoken by the user to the automated assistant interface, causes the automated assistant to operate in furtherance of completing an action. The method further includes determining, subsequent to causing the display panel of the computing device to provide the one or more suggestion elements, that the user has provided another spoken utterance that is associated with the other natural language content of the particular suggestion element. The method further includes determining, in response to determining that the user has provided the other spoken utterance, whether a combination of the spoken utterance and the other spoken utterance are complete. The method further includes, when the combination of the spoken utterance and the other spoken utterance are determined to be complete: causing the one or more actions to be performed via the automated assistant based on the natural language content and the other spoken utterance.

These and other implementations of the technology disclosed herein can include one or more of the following features.

In some implementations, performing speech-to-text processing on the data that characterizes the spoken utterance provided by the user includes generating one or more candidate text segments from the data, and the method further includes, when the spoken utterance is determined to be incomplete: causing the display panel of the computing device to provide a graphical representation of at least one candidate text segment of the one or more candidate text segments. In some versions of those implementations, the method further includes, when the spoken utterance is determined to be complete and to include all mandatory parameters for the one or more actions: causing the display panel of the computing device to bypass providing the graphical representation of the at least one candidate text segment of the one or more candidate text segments, and bypass providing the one or more suggestion elements. In some other versions of those implementations, the method further includes, when the spoken utterance is determined to be complete: identifying a natural language command that, when spoken by one or more users to the automated assistant interface: results in a reduced amount of speech-to-text processing compared to an amount of speech-to-text processing associated with the spoken utterance from the user, and causes the automated assistant to operate in furtherance of completing the action; generating, based on identifying the natural language command, one or more other suggestion elements that characterize the natural language command; and causing, at least in response to determining that the spoken utterance is complete, the display panel of the computing device to provide the one or more other suggestion elements.

In some implementations, the method further includes, when the spoken utterance is determined to be incomplete: selecting a speech-to-text processing model, from multiple different speech-to-text processing models, based on: a type of spoken utterance that is expected from the user when at least one suggestion element is provided via the display panel.

In some implementations, the method further includes, when the spoken utterance is determined to be incomplete: biasing speech-to-text processing toward one or more terms of the one or more suggestion elements and/or toward one or more anticipated types of content that correspond to the one or more suggestion elements.

In some implementations, the method further includes: determining whether a threshold duration of spoken input silence followed the spoken utterance. In some of those implementations, causing the display panel of the computing device to provide the one or more suggestion elements is further in response to determining that at least the threshold duration of spoken input silence followed the spoken utterance.

In some implementations, performing the speech-to-text processing includes determining a first candidate text segment and a second candidate text segment, where the first candidate text segment and the second candidate text segment correspond to different interpretations of the spoken utterance. In some of those implementations, the particular suggestion element is determined based on the first candidate text segment, and at least one other suggestion element is determined based on the second candidate text segment. In some versions of those implementations, causing the display panel connected to the computing device to provide the one or more suggestion elements includes causing the display panel connected to the computing device to: graphically represent the first candidate text segment adjacent to the particular suggestion element, and graphically represent the second candidate text segment adjacent to the at least one other suggestion element. In some of those versions, determining that the user has provided the other spoken utterance that is associated with the other natural language content of the particular suggestion element includes determining, based on the other spoken utterance, whether the user identified the first candidate text segment or the second candidate text segment.

In some implementations, the method further includes, when the spoken utterance is determined to be incomplete: generating, in response to determining that the spoken utterance is incomplete, the other natural language content based on historical data that characterizes one or more previous interactions between the user and the automated assistant in which: a previous action was accomplished via the automated assistant, and the user identified at least a portion of the other natural language content during the one or more previous interactions.

In some implementations, the method further includes, when the spoken utterance is determined to be incomplete: generating, in response to determining that the spoken utterance is incomplete, the other natural language content based on device topology data that characterizes a relationship between various devices associated with the user, where the particular suggestion element is based on the device topology data and identifies one or more devices of the various devices associated with the user.

In some implementations, causing the one or more actions to be performed via the automated assistant based on the natural language content and the other spoken utterance includes controlling a device.

In some implementations, the particular suggestion element further includes a graphical element that indicates the action.

In some implementations, the method further includes, when the spoken utterance is determined to be incomplete: determining a particular duration to await the other spoken utterance after provisioning of the one or more suggestion elements, where the particular duration is determined based on the spoken utterance being determined to be incomplete. In some versions of those implementations, the method further includes, when the spoken utterance is determined to be complete: generating one or more other suggestion elements that are based on the complete spoken utterance; causing the display panel of the computing device to provide the one or more other suggestion elements; and determining an alternate particular duration to await a further spoken utterance after provisioning of the one or more other suggestion elements, The alternate particular duration is shorter than the particular duration, and the alternate particular duration is determined based on the spoken utterance being determined to be complete.

In some implementations, a method implemented by one or more processors is provided and includes performing speech-to-text processing on data that characterizes a spoken utterance provided by a user in furtherance of causing an automated assistant to perform an action. The spoken utterance includes natural language content and is received via an automated assistant interface of a computing device that is connected to a display panel. The method further includes determining, based on performing the speech-to-text processing on the data that characterizes the spoken utterance, whether the spoken utterance is complete, which includes at least determining whether the natural language content is void of one or more parameter values for controlling a function associated with the action. The method further includes, when the spoken utterance is determined to be incomplete: causing, in response to determining that the spoken utterance is incomplete, the display panel connected to the computing device to provide one or more suggestion elements. The one or more suggestion elements include a particular suggestion element that provides, via the display panel, other natural language content that, when spoken by the user to the automated assistant interface, causes the automated assistant to operate in furtherance of completing the action. The method further includes determining that the user has selected, via another spoken utterance received at the automated assistant interface, the particular suggestion element of the one or more suggestion elements. The method further includes causing, in response to determining that the user has selected the particular suggestion element, the action to be performed based on the other natural language content of the particular suggestion element and the natural language content of the spoken utterance. The method further includes, when the spoken utterance is determined to be complete: causing, in response to determining that the spoken utterance is complete, the action to be performed based on the natural language content of the spoken utterance.

These and other implementations of the technology disclosed herein can include one or more of the following features.

In some implementations, the method further includes, when the spoken utterance is determined to be incomplete: causing, in response to determining that the user has selected the particular suggestion element, a priority associated with the other natural language content to be modified from a previous priority that was associated with the other natural language content before the spoken utterance was determined to be incomplete. In some of those implementations, an order of presentation the particular suggestion element, relative to at least one other suggestion element, at the display panel is at least partially based on an assigned priority to the other natural language content.

In some implementations, a method implemented by one or more processors is provided and includes performing speech-to-text processing on data that characterizes a spoken utterance provided by a user in furtherance of causing an automated assistant to perform an action. The spoken utterance includes natural language content and is received via an automated assistant interface of a computing device that is connected to a display panel. The method further includes determining, based on performing the speech-to-text processing on the data that characterizes the spoken utterance, whether the spoken utterance is complete, which includes at least determining whether the natural language content is void of one or more parameter values for controlling a function associated with the action. The method further includes, when the spoken utterance is determined to be incomplete: determining, based on contextual data that is accessible via the computing device, contextual data that characterizes a context in which the user provided the spoken utterance to the automated assistant interface; determining, based on the contextual data, a time to present one or more suggestions via the display panel, where the contextual data indicates that the user previously provided a separate spoken utterance to the automated assistant in the context; and causing, based on determining the time to present the one or more suggestions via the display panel, the display panel of the computing device to provide one or more suggestion elements. The one or more suggestion elements include a particular suggestion element that provides, via the display panel, other natural language content that, when spoken by the user to the automated assistant interface, causes the automated assistant to operate in furtherance of completing the action.

These and other implementations of the technology disclosed herein can include one or more of the following features.

In some implementations, determining the time to present the one or more suggestions includes comparing the contextual data to other contextual data that characterizes a previous instance in which the user, or one or more other users, provided one or more other spoken utterances while in the context.

In some implementations, the method further includes, when the spoken utterance is determined to be incomplete: identifying a natural language command that, when spoken by one or more users to the automated assistant interface: results in a reduced amount of speech-to-text processing compared to an amount of speech-to-text processing associated with the spoken utterance from the user, and causes the automated assistant to operate in furtherance of completing the action. The natural language command is embodied by certain content of another suggestion element of the one or more suggestion elements.

In some implementations, a method implemented by one or more processors is provided and includes performing speech-to-text processing on audio data that characterizes a spoken utterance provided by a user. The spoken utterance includes natural language content and is received via an automated assistant interface of a computing device that is connected to a display panel. The method further includes causing, based on performing the speech-to-text processing on the audio data that characterizes the spoken utterance, a first action to be performed based on the natural language content. The method further includes causing, in response to determining that the user has provided the spoken utterance that includes the natural language content, the display panel of the computing device to provide one or more suggestion elements. The one or more suggestion elements include a particular suggestion element that provides, via the display panel, other natural language content that, when spoken by the user to the automated assistant interface, causes the automated assistant to operate in furtherance of completing the actions. The method further includes: determining that the user has selected, via a subsequent spoken utterance received at the automated assistant interface, the particular suggestion element of the one or more suggestion elements; and causing, in response to determining that the user has selected the particular suggestion element, a second action to be performed based on the other natural language content identified by the particular suggestion element.

These and other implementations of the technology disclosed herein can include one or more of the following features.

In some implementations, performance of the second action results in action data that is a modification of other action data that resulted from performance of the first action, and/or supplements the other action data that resulted from the performance of the first action. In some of those implementations, the method further includes generating, in response to determining that the user has provided the spoken utterance, the other natural language content, where the other natural language content identifies at least one suggested value for a parameter used during performance of the second action.

In some implementations, causing the first action to be performed includes causing data, which is based on predetermined default content associated with the user, to be provided at the computing device. In some of those implementations, the method further includes modifying, based on the user selecting the particular suggestion element, the default content in furtherance of the modified default content being available when a subsequent incomplete request from the user is received.

In some implementations, a method implemented by one or more processors is provided and includes generating text based on performing speech-to-text processing on audio data that captures a spoken utterance provided by a user. The spoken utterance is received via an automated assistant interface of a computing device that is connected to a display panel. The method further includes determining, based on the text, whether the spoken utterance is complete or is incomplete. The method further includes determining a particular duration based on whether the spoken utterance is determined to be complete or incomplete. The particular duration is shorter when the spoken utterance is determined to be complete than it is when the particular duration is determined to be incomplete. The method further includes generating one or more suggestion elements based on the text, where the one or more suggestion elements each indicate corresponding additional text that, when combined with the text, causes the automated assistant to operate in furtherance of a corresponding action. The method further includes: causing the display panel of the computing device to provide the one or more suggestion elements; and monitoring for further spoken input for the determined duration, after provisioning of the one or more suggestion elements. The method further includes, when the further spoken input is received within the duration: generating an automated assistant command based on the candidate text and additional text generated from performing speech-to-text processing on further audio data that captures the further spoken input, and causing the automated assistant to execute the automated assistant command. The method further includes, when the further spoken input is not received within the duration: causing the automated assistant to execute an alternate command based on only the candidate text.

These and other implementations of the technology disclosed herein can include one or more of the following features.

In some implementations, the spoken utterance is determined to be complete, and determining the particular duration based on whether the spoken utterance is determined to be complete or incomplete further includes: determining the particular duration to be a first particular duration when the spoken utterance is determined to be complete and directed to a particular automated assistant agent that is not a general search agent; and determining the particular duration to be a second particular duration when the spoken utterance is determined to be complete and directed to the general search agent. The second particular duration is longer than the first particular duration.

In some implementations, the spoken utterance is determined to be complete, and determining the particular duration based on whether the spoken utterance is determined to be complete or incomplete further includes: determining the particular duration to be a first particular duration when the spoken utterance is determined to be complete and to include all mandatory parameters; and determining the particular duration to be a second particular duration when the spoken utterance is determined to be complete but lacking all the mandatory parameters. The second particular duration is longer than the first particular duration.

In each implementation it may be determined that the spoken utterance is incomplete and the associated processing may be performed. In other implementations it may be determined that the spoken utterance is complete and the associated processing may be performed.

We claim:
1. A method implemented by one or more processors, the method comprising:
  performing speech-to-text processing on data that characterizes a spoken utterance provided by a user, wherein the spoken utterance includes natural language content and is received via an automated assistant interface of a computing device that is connected to a display panel;
  determining, based on performing the speech-to-text processing on the data that characterizes the spoken utterance, whether the spoken utterance is complete, which includes at least determining whether an automated assistant can cause one or more actions to be accomplished based on the natural language content;

when the spoken utterance is determined to be incomplete:

causing, in response to determining that the spoken utterance is incomplete, the display panel of the computing device to provide one or more suggestion elements, wherein the one or more suggestion elements include a particular suggestion element that provides, via the display panel, other natural language content that, when spoken by the user to the automated assistant interface, causes the automated assistant to operate in furtherance of completing an action, determining, subsequent to causing the display panel of the computing device to provide the one or more suggestion elements, that the user has provided another spoken utterance that is associated with the other natural language content of the particular suggestion element, determining a particular duration to await the other spoken utterance after provisioning of the one or more suggestion elements, wherein the particular duration is determined based on the spoken utterance being determined to be incomplete, determining, in response to determining that the user has provided the other spoken utterance, whether a combination of the spoken utterance and the other spoken utterance are complete, and when the combination of the spoken utterance and the other spoken utterance is determined to be complete:

causing the one or more actions to be performed via the automated assistant based on the natural language content and the other spoken utterance, generating one or more other suggestion elements that are based on the complete spoken utterance, causing the display panel of the computing device to provide the one or more other suggestion elements, and determining an alternate particular duration to await a further spoken utterance after provisioning of the one or more other suggestion elements, wherein the alternate particular duration is shorter than the particular duration, and the alternate particular duration is determined based on the spoken utterance being determined to be complete.

2. The method of claim 1, wherein performing speech-to-text processing on the data that characterizes the spoken utterance provided by the user includes generating one or more candidate text segments from the data, and the method further comprises:

when the spoken utterance is determined to be incomplete:

causing the display panel of the computing device to provide a graphical representation of at least one candidate text segment of the one or more candidate text segments.

3. The method of claim 2, further comprising:
when the spoken utterance is determined to be complete and to include all mandatory parameters for the one or more actions:

causing the display panel of the computing device to bypass providing the graphical representation of the at least one candidate text segment of the one or more candidate text segments, and bypass providing the one or more suggestion elements.

4. The method of claim 2, further comprising:
when the spoken utterance is determined to be complete:

identifying a natural language command that, when spoken by one or more users to the automated assistant interface: results in a reduced amount of speech-to-text processing compared to an amount of speech-to-text processing associated with the spoken utterance from the user, and causes the automated assistant to operate in furtherance of completing the action;

generating, based on identifying the natural language command, one or more additional suggestion elements that characterize the natural language command; and causing, at least in response to determining that the spoken utterance is complete, the display panel of the computing device to provide the one or more additional suggestion elements.

5. The method of claim 1, further comprising:
when the spoken utterance is determined to be incomplete:

selecting a speech-to-text processing model, from multiple different speech-to-text processing models, based on: a type of spoken utterance that is expected from the user when at least one suggestion element is provided via the display panel.

6. The method of claim 1, further comprising:
when the spoken utterance is determined to be incomplete:

biasing speech-to-text processing toward one or more terms of the one or more suggestion elements and/or toward one or more anticipated types of content that correspond to the one or more suggestion elements.

7. The method of claim 1, further comprising:
determining whether a threshold duration of spoken input silence followed the spoken utterance, wherein causing the display panel of the computing device to provide the one or more suggestion elements is further in response to determining that at least the threshold duration of spoken input silence followed the spoken utterance.

8. The method of claim 1,
wherein performing the speech-to-text processing includes determining a first candidate text segment and a second candidate text segment, wherein the first candidate text segment and the second candidate text segment correspond to different interpretations of the spoken utterance, and wherein the particular suggestion element is determined based on the first candidate text segment, and at least one other suggestion element is determined based on the second candidate text segment.

9. The method of claim 8, wherein causing the display panel connected to the computing device to provide the one or more suggestion elements includes causing the display panel connected to the computing device to: graphically represent the first candidate text segment adjacent to the particular suggestion element, and graphically represent the second candidate text segment adjacent to the at least one other suggestion element.

10. The method of claim 9, wherein determining that the user has provided the other spoken utterance that is associated with the other natural language content of the particular suggestion element includes determining, based on the other spoken utterance, whether the user identified the first candidate text segment or the second candidate text segment.

11. The method of claim 1, further comprising:
when the spoken utterance is determined to be incomplete:

generating, in response to determining that the spoken utterance is incomplete, the other natural language content based on historical data that characterizes one or more previous interactions between the user and the automated assistant in which: a previous action was accomplished via the automated assistant, and the user identified at least a portion of the other natural language content during the one or more previous interactions.

12. The method of claim 1, further comprising:
when the spoken utterance is determined to be incomplete:
generating, in response to determining that the spoken utterance is incomplete, the other natural language content based on device topology data that characterizes a relationship between various devices associated with the user,
wherein the particular suggestion element is based on the device topology data and identifies one or more devices of the various devices associated with the user.

13. A method implemented by one or more processors, the method comprising:
performing speech-to-text processing on data that characterizes a spoken utterance provided by a user in furtherance of causing an automated assistant to perform an action, wherein the spoken utterance includes natural language content and is received via an automated assistant interface of a computing device that is connected to a display panel;
determining, based on performing the speech-to-text processing on the data that characterizes the spoken utterance, whether the spoken utterance is complete, which includes at least determining whether the natural language content is void of one or more parameter values for controlling a function associated with the action;
when the spoken utterance is determined to be incomplete:
causing, in response to determining that the spoken utterance is incomplete, the display panel connected to the computing device to provide one or more suggestion elements,
wherein the one or more suggestion elements include a particular suggestion element that provides, via the display panel, other natural language content that, when spoken by the user to the automated assistant interface, causes the automated assistant to operate in furtherance of completing the action,
determining that the user has selected, via another spoken utterance received at the automated assistant interface, the particular suggestion element of the one or more suggestion elements,
determining a particular duration to await the other spoken utterance after provisioning of the one or more suggestion elements, wherein the particular duration is determined based on the spoken utterance being determined to be incomplete, and
causing, in response to determining that the user has selected the particular suggestion element, the action to be performed based on the other natural language content of the particular suggestion element and the natural language content of the spoken utterance; and
when the spoken utterance is determined to be complete:
causing, in response to determining that the spoken utterance is complete, the action to be performed based on the natural language content of the spoken utterance,
generating one or more other suggestion elements that are based on the complete spoken utterance,
causing the display panel of the computing device to provide the one or more other suggestion elements, and
determining an alternate particular duration to await a further spoken utterance after provisioning of the one or more other suggestion elements, wherein the alternate particular duration is shorter than the particular duration, and the alternate particular duration is determined based on the spoken utterance being determined to be complete.

14. The method of claim 13, further comprising:
when the spoken utterance is determined to be incomplete:
causing, in response to determining that the user has selected the particular suggestion element, a priority associated with the other natural language content to be modified from a previous priority that was associated with the other natural language content before the spoken utterance was determined to be incomplete.

15. The method of claim 13, further comprising:
when the spoken utterance is determined to be incomplete:
generating, in response to determining that the spoken utterance is incomplete, the other natural language content based on historical data that characterizes one or more previous interactions between the user and the automated assistant in which: a previous action was accomplished via the automated assistant, and the user identified at least a portion of the other natural language content during the one or more previous interactions.

16. The method of claim 13, further comprising:
when the spoken utterance is determined to be incomplete:
generating, in response to determining that the spoken utterance was incomplete, the other natural language content based on device topology data that characterizes a relationship between various devices associated with the user,
wherein the particular suggestion element is based on the device topology data and identifies one or more devices of the various devices associated with the user.

17. The method of claim 13,
wherein performing the speech-to-text processing includes determining a first candidate text segment and a second candidate text segment, wherein the first candidate text segment and the second candidate text segment correspond to different interpretations of the spoken utterance, and
wherein at least one suggestion element of the one or more suggestion elements is determined based on the first candidate text segment, and at least one other suggestion element is determined based on the second candidate text segment.

18. The method of claim 17, wherein causing the display panel connected to the computing device to provide one or more suggestion elements includes causing the display panel connected to the computing device to: graphically represent the first candidate text segment adjacent to the at least one suggestion element, and graphically represent the second candidate text segment adjacent to the at least one other suggestion element.

19. A system comprising:
a memory for storing instructions; and
at least one processor, the at least one processor configured to execute the instructions to perform a method that includes:
  performing speech-to-text processing on data that characterizes a spoken utterance provided by a user, wherein the spoken utterance includes natural language content and is received via an automated assistant interface of a computing device that is connected to a display panel;
  determining, based on performing the speech-to-text processing on the data that characterizes the spoken utterance, whether the spoken utterance is complete, which includes at least determining whether an automated assistant can cause one or more actions to be accomplished based on the natural language content;
  when the spoken utterance is determined to be incomplete:
    causing, in response to determining that the spoken utterance is incomplete, the display panel of the computing device to provide one or more suggestion elements,
      wherein the one or more suggestion elements include a particular suggestion element that provides, via the display panel, other natural language content that, when spoken by the user to the automated assistant interface, causes the automated assistant to operate in furtherance of completing an action,
    determining, subsequent to causing the display panel of the computing device to provide the one or more suggestion elements, that the user has provided another spoken utterance that is associated with the other natural language content of the particular suggestion element,
    determining a particular duration to await the other spoken utterance after provisioning of the one or more suggestion elements, wherein the particular duration is determined based on the spoken utterance being determined to be incomplete,
    determining, in response to determining that the user has provided the other spoken utterance, whether a combination of the spoken utterance and the other spoken utterance are complete, and
    when the combination of the spoken utterance and the other spoken utterance is determined to be complete:
      causing the one or more actions to be performed via the automated assistant based on the natural language content and the other spoken utterance,
      generating one or more other suggestion elements that are based on the complete spoken utterance,
      causing the display panel of the computing device to provide the one or more other suggestion elements, and
      determining an alternate particular duration to await a further spoken utterance after provisioning of the one or more other suggestion elements, wherein the alternate particular duration is shorter than the particular duration, and the alternate particular duration is determined based on the spoken utterance being determined to be complete.

20. The system of claim 19, wherein:
performing the speech-to-text processing includes determining a first candidate text segment and a second candidate text segment, wherein the first candidate text segment and the second candidate text segment correspond to different interpretations of the spoken utterance, and
the particular suggestion element is determined based on the first candidate text segment, and at least one other suggestion element is determined based on the second candidate text segment.

* * * * *